US012560267B2

(12) United States Patent
Stern et al.

(10) Patent No.: US 12,560,267 B2
(45) Date of Patent: Feb. 24, 2026

(54) WIDE RANGE TAPPING SLEEVE

(71) Applicant: Mueller International, LLC, Atlanta, GA (US)

(72) Inventors: Timothy Wayne Stern, Hixson, TN (US); David Latimore Hughes, Jr., Signal Mountain, TN (US); Timothy J. Mitchell, Hixson, TN (US)

(73) Assignee: Mueller International, LLC, Atlanta, GA (US)

( * ) Notice: Subject to any disclaimer, the term of this patent is extended or adjusted under 35 U.S.C. 154(b) by 130 days.

(21) Appl. No.: 18/151,303

(22) Filed: Jan. 6, 2023

(65) Prior Publication Data

US 2024/0230005 A1 Jul. 11, 2024

(51) Int. Cl.
F16L 41/06 (2006.01)
F16L 47/34 (2006.01)

(52) U.S. Cl.
CPC ............. F16L 41/065 (2013.01); F16L 41/06 (2013.01); F16L 47/345 (2013.01)

(58) Field of Classification Search
CPC ......... F16L 41/065; F16L 41/06; F16L 41/04; F16L 41/12; F16L 47/34; F16L 47/345
USPC ........... 137/318; 138/92, 151, 156, 158, 161
See application file for complete search history.

(56) References Cited

U.S. PATENT DOCUMENTS 1,835,473 A * 12/1931 Davidson ................. E04G 7/16
403/53
1,937,793 A 12/1933 Seaberg 2,616,736 A 11/1952 Smith
2,684,859 A 7/1954 Longley
3,081,812 A * 3/1963 Brown ................... F16L 41/06
72/124
3,554,217 A 1/1971 Ehrens et al.
3,558,162 A 1/1971 Ferrai et al.
(Continued)

FOREIGN PATENT DOCUMENTS

DE 102008058339 6/2009
FR 821841 12/1937
(Continued)

OTHER PUBLICATIONS

Floyd, Scott P.; Office Action for Canadian patent application No. 2,957,450, filed Feb. 9, 2017, mailed Sep. 7, 2023, 7 pgs.
(Continued)

*Primary Examiner* — Craig M Schneider
*Assistant Examiner* — Andrew J Rost
(74) *Attorney, Agent, or Firm* — Taylor Duma LLP

(57) ABSTRACT

A tapping sleeve for a pipe element can include first and second sleeve portions, each defining a first axial end, a second axial end, a first side end, a second side end, and an arcuate portion extending between the first side end and the second side end; the second sleeve portion hingedly secured to the first sleeve portion; and a connecting element joining the first side ends of the first and second sleeve portions; wherein the connecting element, the first side end of the first sleeve portion, and the first side end of the second sleeve portion define at least a portion of a hinge of the tapping sleeve, a position of the first sleeve portion with respect to the second sleeve portion in an assembled condition in a circumferential direction of the tapping sleeve being different between the at least two assembled conditions of the hinge.

40 Claims, 16 Drawing Sheets

(56) References Cited

U.S. PATENT DOCUMENTS

| | | | | |
|---|---|---|---|---|
| 3,725,973 A * | 4/1973 | Gwozdz | ..................... | E05D 5/14 |
| | | | | 16/273 |
| 3,737,180 A | 6/1973 | Hayes, Jr. et al. | | |
| 3,779,272 A | 12/1973 | Dunmire | | |
| 3,792,879 A | 2/1974 | Dunmire et al. | | |
| 4,140,155 A * | 2/1979 | Tannery | ................ | F16L 41/065 |
| | | | | 285/197 |
| 4,391,458 A * | 7/1983 | Blakeley | ................. | F16L 41/12 |
| | | | | 285/112 |
| 4,484,785 A * | 11/1984 | Jackson | .............. | E21B 17/1035 |
| | | | | 138/112 |
| 4,653,782 A | 3/1987 | Munday | | |
| 4,708,373 A | 11/1987 | Morriss, Jr. | | |
| 4,958,860 A * | 9/1990 | Akitsu | ................ | F16L 27/1012 |
| | | | | 285/226 |
| 5,040,828 A | 8/1991 | Kane | | |
| 5,170,813 A | 12/1992 | Francis | | |
| 5,211,047 A | 5/1993 | Kaneyuki | | |
| 5,358,286 A | 10/1994 | Eaton et al. | | |
| 5,374,087 A | 12/1994 | Powers | | |
| 5,797,423 A | 8/1998 | Abbad et al. | | |
| 5,906,048 A * | 5/1999 | Bender | ................. | F16L 47/345 |
| | | | | 137/5 |
| 6,158,474 A | 12/2000 | Ishikawa et al. | | |
| 6,364,367 B1 | 4/2002 | Hintzen | | |
| 6,412,824 B2 | 7/2002 | Kunsman | | |
| 7,137,762 B2 * | 11/2006 | Severa | .................. | F16L 47/345 |
| | | | | 408/101 |
| 7,252,459 B2 * | 8/2007 | Bideault | ................. | F16L 41/06 |
| | | | | 405/184.1 |
| 8,176,929 B1 | 5/2012 | Collins | | |
| 8,313,124 B2 * | 11/2012 | Krausz | .................... | F16L 41/12 |
| | | | | 285/110 |
| 8,439,408 B2 | 5/2013 | Glocer et al. | | |
| 8,857,858 B2 | 10/2014 | Minich et al. | | |
| 9,157,553 B1 * | 10/2015 | Williams | ........... | E21B 43/0122 |
| 10,514,123 B2 | 12/2019 | Floyd et al. | | |
| 11,608,925 B2 | 3/2023 | Floyd et al. | | |
| 2001/0007263 A1 | 7/2001 | Powers | | |
| 2003/0226412 A1 | 12/2003 | Rumminger et al. | | |
| 2007/0052239 A1 | 3/2007 | Dole | | |
| 2012/0193909 A1 | 8/2012 | Minich et al. | | |
| 2013/0187379 A1 | 7/2013 | Beagan, Jr. | | |
| 2013/0206252 A1 * | 8/2013 | Leto | ........................ | F16L 29/02 |
| | | | | 137/318 |
| 2013/0213109 A1 | 8/2013 | Ogasawara | | |
| 2014/0261760 A1 | 9/2014 | Minich et al. | | |
| 2015/0300549 A1 | 10/2015 | Chen-Sheng et al. | | |
| 2017/0261143 A1 * | 9/2017 | Boyes | .................... | F16L 41/12 |
| 2017/0261144 A1 | 9/2017 | Floyd | | |
| 2020/0080677 A1 | 3/2020 | Floyd et al. | | |

FOREIGN PATENT DOCUMENTS

| | | |
|---|---|---|
| FR | 51614 | 3/1943 |
| FR | 2678350 | 12/1992 |
| FR | 2881203 | 7/2006 |

OTHER PUBLICATIONS

Floyd, Scott P.; Final Office Action for U.S. Appl. No. 15/066,441, filed Mar. 10, 2016, mailed Nov. 19, 2018, 13 pgs.

Floyd, Scott P.; Non-Final Office Action for U.S. Appl. No. 15/066,441, filed Mar. 10, 2016, mailed Jun. 29, 2018, 16 pgs.

Floyd, Scott P.; Notice of Allowance for U.S. Appl. No. 15/066,441, filed Mar. 10, 2016, mailed Aug. 26, 2019, 10 pgs.

Floyd, Scott P.; Restriction Requirement for U.S. Appl. No. 15/066,441, filed Mar. 10, 2016, mailed Apr. 26, 2018, 8 pgs.

Floyd, Scott P.; Advisory Action for U.S. Appl. No. 16/685,542, filed Nov. 15, 2019, mailed Nov. 3, 2022, 3 pgs.

Floyd, Scott P.; Ex Parte Quayle Action for U.S. Appl. No. 16/685,542, filed Nov. 15, 2019, mailed Dec. 6, 2022, 6 pgs.

Floyd, Scott P.; Final Office Action for U.S. Appl. No. 16/685,542, filed Nov. 15, 2019, mailed Aug. 24, 2022, 9 pgs.

Floyd, Scott P.; Non-Final Office Action for U.S. Appl. No. 16/685,542, filed Nov. 15, 2019, mailed Jun. 7, 2022, 21 pgs.

Floyd, Scott P.; Non-Final Office Action for U.S. Appl. No. 15/066,441, filed Mar. 10, 2016, mailed Jun. 28, 2019, 14 pgs.

Floyd, Scott P.; Office Action for Mexico application No. MX/a/2017/002947, filed Mar. 6, 2017, mailed Oct. 21, 2020, 5 bgs.

Krausz; Product Specifications for HYMAX Tapped Clamp (4"-24"); publicly available prior to Jan. 6, 2022, 4 pgs.

Krausz; Installation Instructions for HYMAX Tapped Clamp (4"-24"); publicly available prior to Jan. 6, 2022, 4 pgs.

Mueller Co., LLC; Brochure entitled: Innovative Product Portfolio—HYMAX; Copyright 2020, 8 pgs.

Mueller Co., LLC; Installation Instructions for H-304 Stainless Steel Tapping Sleeve, Copyright 2020, 2 pgs.

Mueller Co., LLC; Specification Sheet for Fabricated Stainless Steel Tapping Sleeves 4x4 Thru 24x12 Sizes H304, publicly available prior to Jan. 6, 2022, 2 pgs.

Ayotte Enterprises Inc.; Specification Sheet for Ayotte A-320 Carbon Steel Tapping Sleeve titled "Manchon De Perforation A-320," publicly available prior to Mar. 10, 2015, 1 pg.

Ayotte Enterprises, Inc.; Product Image and Description for Ayotte A-320 Carbon Steel Tapping Sleeve titled "A-320 Carbon Steel Tapping Sleeve," publicly available prior to Mar. 10, 2015, 1 pg.

Mueller Co.; Specification sheet for Mechanical Joint Tapping Sleeve for Centrifugal C.I., D.I., & PVC Pipe, publicly available prior to Mar. 10, 2016, 4 pgs.

Mueller Co.; Specification Sheet for Mueller Tapping Material and Specialty Valves, publicly available prior to Mar. 10, 2016, 30 pgs.

Mueller Co.; Specification sheet for Stainless Steel Tapping Sleeve 4"-24", publicly available prior to Mar. 10, 2016, 4 pgs.

Floyd, Scott P.; Notice of Allowance for U.S. Appl. No. 16/685,542, filed Nov. 15, 2019, mailed Feb. 13, 2023, 5 pgs.

Floyd, Scott P.; Office Action for Canadian patent application No. 2,957,450, filed Feb. 9, 2017, mailed Mar. 1, 2023, 6 pgs.

Floyd, Scott P.; Office Action for Mexico patent application No. MX/a//2020/013764, filed Mar. 6, 2017, mailed Dec. 14, 2023, 7 pgs.

Wilkinson, Sean; Office Action for Canadian Patent Application No. 2,957,450, filed Feb. 9, 2017, mailed Oct. 3, 2024, 7 pgs.

* cited by examiner

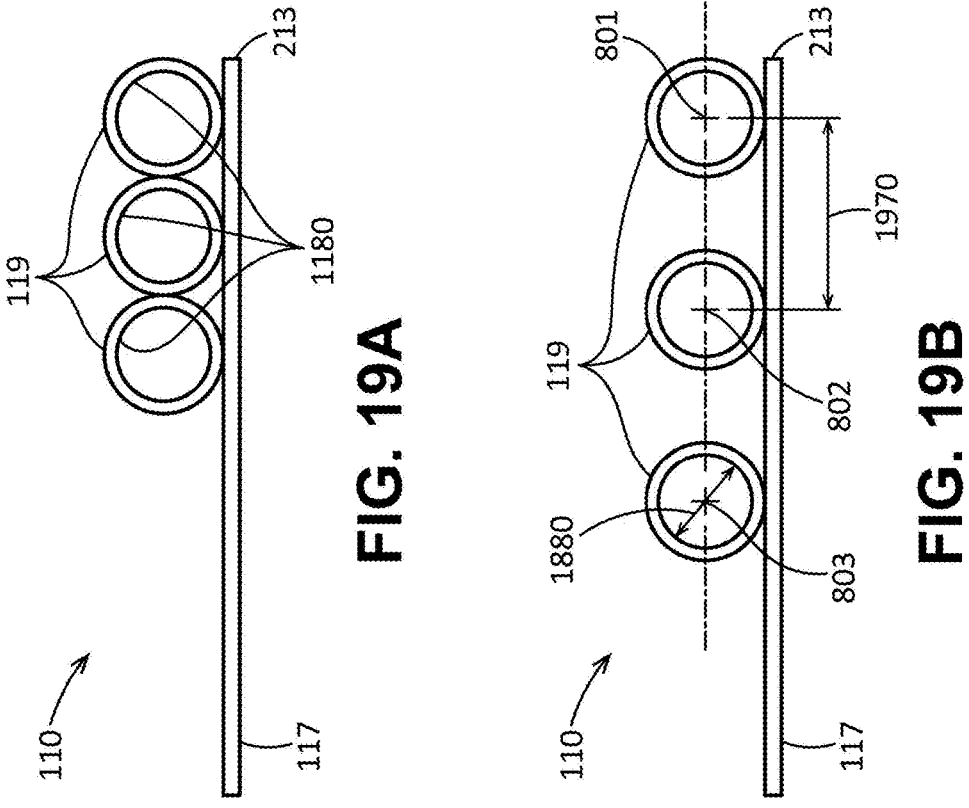
FIG. 19A
FIG. 19B
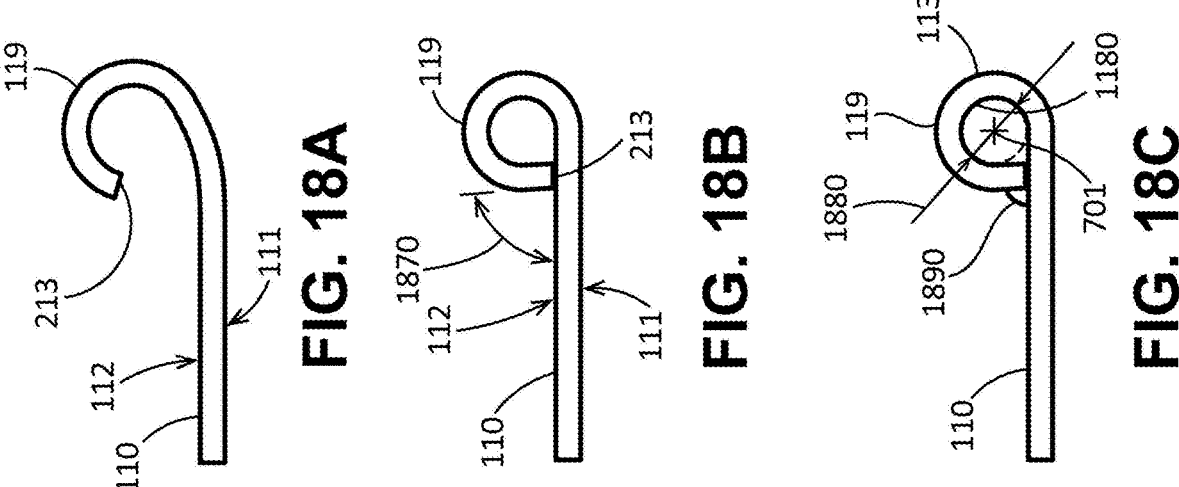
FIG. 18A
FIG. 18B
FIG. 18C

WIDE RANGE TAPPING SLEEVE

TECHNICAL FIELD

Field of Use

This disclosure relates to tapping sleeves. More specifically, this disclosure relates to tapping sleeves configured to accommodate a range of pipe diameters.

Related Art

Fluid distribution systems, such as water distribution systems and gas distribution systems, utilize pipelines to deliver fluid to various locations within the system. The pipelines conventionally can contain pipe elements, which can be located above ground or buried within the ground. It is sometimes necessary to add new branch lines to the pipelines to expand pipelines to deliver fluid to new locations. It is sometimes necessary to install new branch lines to replace existing branch lines that are no longer serviceable. To connect the branch lines to the pipelines, tapping sleeves are conventionally utilized to allow for in-service tapping of the pipeline.

The multiple sleeve portions of a tapping sleeve are typically joined to each connection with a row of fasteners. With each row of fasteners used in a tapping sleeve can come additional manufacturing cost and longer installation time and can result in the tapping sleeve being able to accommodate only a single diameter of the pipe element.

SUMMARY

It is to be understood that this summary is not an extensive overview of the disclosure. This summary is exemplary and not restrictive and is intended to neither identify key or critical elements of the disclosure nor delineate the scope thereof. The sole purpose of this summary is to explain and exemplify certain concepts of the disclosure as an introduction to the following complete and extensive detailed description.

In one aspect, disclosed is a tapping sleeve for a pipe element, the tapping sleeve comprising: a first sleeve portion defining: a first axial end; a second axial end; a first side end; a second side end; and an arcuate portion extending between the first side end and the second side end; and a second sleeve portion hingedly secured to the first sleeve portion and defining: a first axial end; a second axial end; a first side end; a second side end; and an arcuate portion extending between the first side end of the second sleeve portion and the second side end of the second sleeve portion; and a connecting element joining the first side end of the first sleeve portion to the first side end of the second sleeve portion; wherein the connecting element, the first side end of the first sleeve portion, and the first side end of the second sleeve portion define at least a portion of a hinge of the tapping sleeve, the hinge defining at least two assembled conditions, a position of the first sleeve portion with respect to the second sleeve portion in an assembled condition in a circumferential direction of the tapping sleeve being different between the at least two assembled conditions.

In a further aspect, disclosed is a device for a pipe element, the device comprising: a first sleeve portion defining: a first axial end; a second axial end; a first side end defining at least one insert, the at least one insert formed from a material that is compressible in normal use; a second side end; and an arcuate portion extending between the first side end and the second side end; and a second sleeve portion hingedly secured to the first sleeve portion and defining: a first axial end; a second axial end; a first side end; a second side end; and an arcuate portion extending between the first side end of the second sleeve portion and the second side end of the second sleeve portion; and a connecting element extending through the at least one insert and joining the first side end of the first sleeve portion to the first side end of the second sleeve portion; wherein the connecting element, the first side end of the first sleeve portion, and the first side end of the second sleeve portion define at least a portion of a hinge of the device.

Various implementations described in the present disclosure may comprise additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims. The features and advantages of such implementations may be realized and obtained by means of the systems, methods, features particularly pointed out in the appended claims. These and other features will become more fully apparent from the following description and appended claims or may be learned by the practice of such exemplary implementations as set forth hereinafter.

BRIEF DESCRIPTION OF THE DRAWINGS

The accompanying drawings, which are incorporated in and constitute a part of this specification, illustrate several aspects of the disclosure and, together with the description, explain various principles of the disclosure. The drawings are not necessarily drawn to scale. Corresponding features and components throughout the figures may be designated by matching reference characters for the sake of consistency and clarity.

FIG. 18A is a side view of the hinge side of the sleeve portion of FIG. 16B being formed in a first step in accordance with another aspect of the current disclosure.

FIG. 18B is a side view of the hinge side of the sleeve portion of FIG. 16B being formed in a second step.

FIG. 18C is a side view of the hinge side of the sleeve portion of FIG. 16B being welded in a third step.

FIG. 19A is a side view of the hinge side of the sleeve portion in accordance with another aspect of the current disclosure.

FIG. 19B is a side view of the hinge side of the sleeve portion of FIG. 19A in accordance with another aspect of the current disclosure.

DETAILED DESCRIPTION

Figure 1:
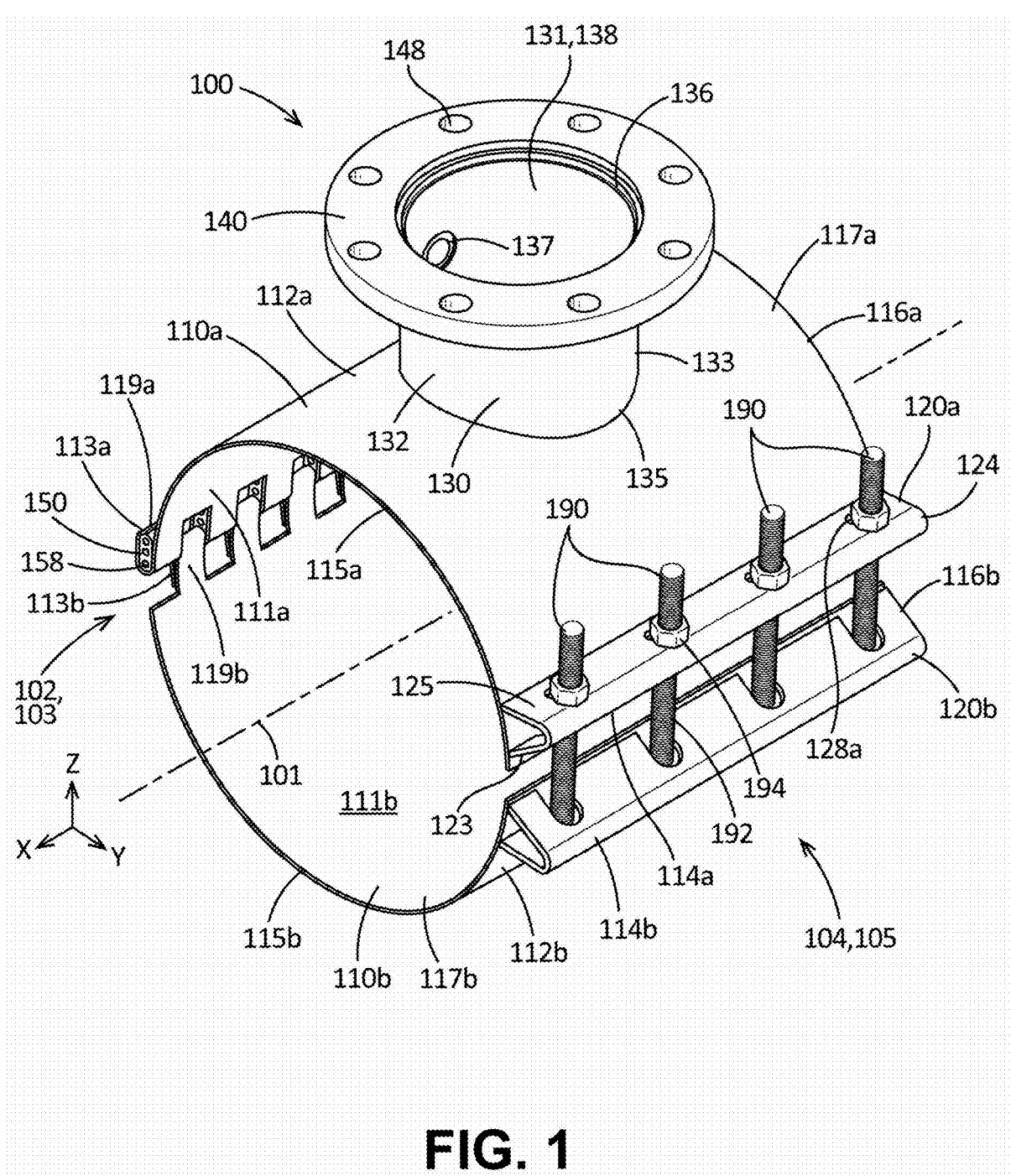
FIG. 1 is a top perspective view of a connection side of a tapping sleeve in accordance with one aspect of the current disclosure.

The present disclosure can be understood more readily by reference to the following detailed description, examples, drawings, and claims, and their previous and following description. However, before the present devices, systems, and/or methods are disclosed and described, it is to be understood that this disclosure is not limited to the specific devices, systems, and/or methods disclosed unless otherwise specified, as such can, of course, vary. It is also to be understood that the terminology used herein is for the purpose of describing particular aspects only and is not intended to be limiting.

The following description is provided as an enabling teaching of the present devices, systems, and/or methods in their best, currently known aspect. To this end, those skilled in the relevant art will recognize and appreciate that many changes can be made to the various aspects described herein while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an," and "the" include plural referents unless the context clearly dictates otherwise. Thus, for example, reference to a quantity of one of a particular element can comprise two or more such elements unless the context indicates otherwise. In addition, any of the elements described herein can be a first such element, a second such element, and so forth (e.g., a first widget and a second widget, even if only a "widget" is referenced).

Ranges can be expressed herein as from "about" one particular value and/or to "about" another particular value. When such a range is expressed, another aspect comprises from the one particular value and/or to the other particular value. Similarly, when values are expressed as approximations, by use of the antecedent "about" or "substantially," it will be understood that the particular value forms another aspect. It will be further understood that the endpoints of each of the ranges are significant both in relation to the other endpoint and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes, and between different models, the tolerance for a particular measurement of a particular component can fall within a range of tolerances.

As used herein, the terms "optional" or "optionally" mean that the subsequently described event or circumstance may or may not occur, and that the description comprises instances where said event or circumstance occurs and instances where it does not.

The word "or" as used herein means any one member of a particular list and also comprises any combination of members of that list. The phrase "at least one of A and B" as used herein means "only A, only B, or both A and B"; while the phrase "one of A and B" means "A or B."

As used herein, unless the context clearly dictates otherwise, the term "monolithic" in the description of a component means that the component is formed as a singular component that constitutes a single material without joints or seams. Unless otherwise specified herein, any structure disclosed in the drawings or in the written description as being so formed can be monolithic whether or not such an explicit description of the structure is included herein.

To simplify the description of various elements disclosed herein, the conventions of "left," "right," "front," "rear," "top," "bottom," "upper," "lower," "inside," "outside," "inboard," "outboard," "horizontal," and/or "vertical" maybe referenced. Unless stated otherwise, "front" describes one axial end of the tapping sleeve nearest to a viewer thereof; "rear" is that end of the tapping sleeve that is opposite or distal the front; "left" is that which is to the left of or facing left from the viewer while facing towards the front; and "right" is that which is to the right of or facing right from the viewer while facing towards the front. "Horizontal" or "horizontal orientation" describes that which is in a plane extending from left to right and aligned with the horizon. "Vertical" or "vertical orientation" describes that which is in a plane that is angled at 90 degrees to the horizontal.

The tapping sleeve can also be described using a coordinate axis of X-Y-Z directions shown in FIG. 1. An X-axis direction can be referred to as a front-rear or axial direction of the tapping sleeve. An upper-lower direction is a Z-axis direction orthogonal to the X-axis direction and to a Y-axis direction. The Y-axis direction is orthogonal to the X-axis direction and the Z-axis direction and can also be referred to as a left-right direction. A surface of a structural element that extends in the X-axis direction and is offset from a main axis of the tapping sleeve can be referred to as a lateral side of the tapping sleeve.

In one aspect, a tapping sleeve and associated methods, systems, devices, and various apparatuses are disclosed herein. In one aspect, the tapping sleeve can comprise a hinge. It would be understood by one of skill in the art that the disclosed tapping sleeve is described in but a few exemplary aspects among many.

Tapping sleeves and other devices that clamp onto pipes using a typical setup of two rows of bolts or a single row of bolts and a plain hinge can be associated with higher manufacturing costs, longer installation time, and/or narrow use on just a single pipe size. In contrast, a clamping device with a wide range hinge can provide the convenience of both a hinge and a bolted connection simultaneously. The hinge can allow for the removal of only one row of bolts along a connection side of the tapping sleeve (or other clamping device) while still allowing flexibility to increase the effective diameter of the sleeve that a standard hinge cannot provide. Additional benefits are cheaper manufacturing and a simpler installation due to the reduction in the number of bolts and nuts to manufacture and tighten.

Figure 6:
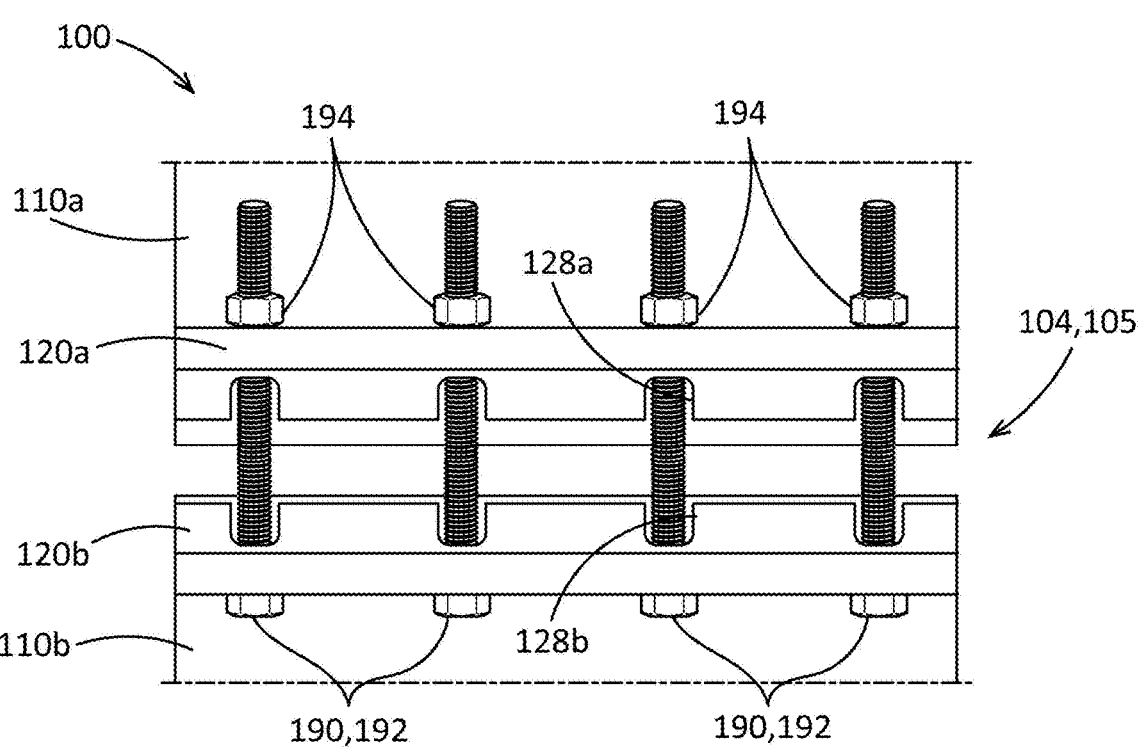
FIG. 6 is a detail side view of the connection side of the tapping sleeve of FIG. 1.
Figure 7:
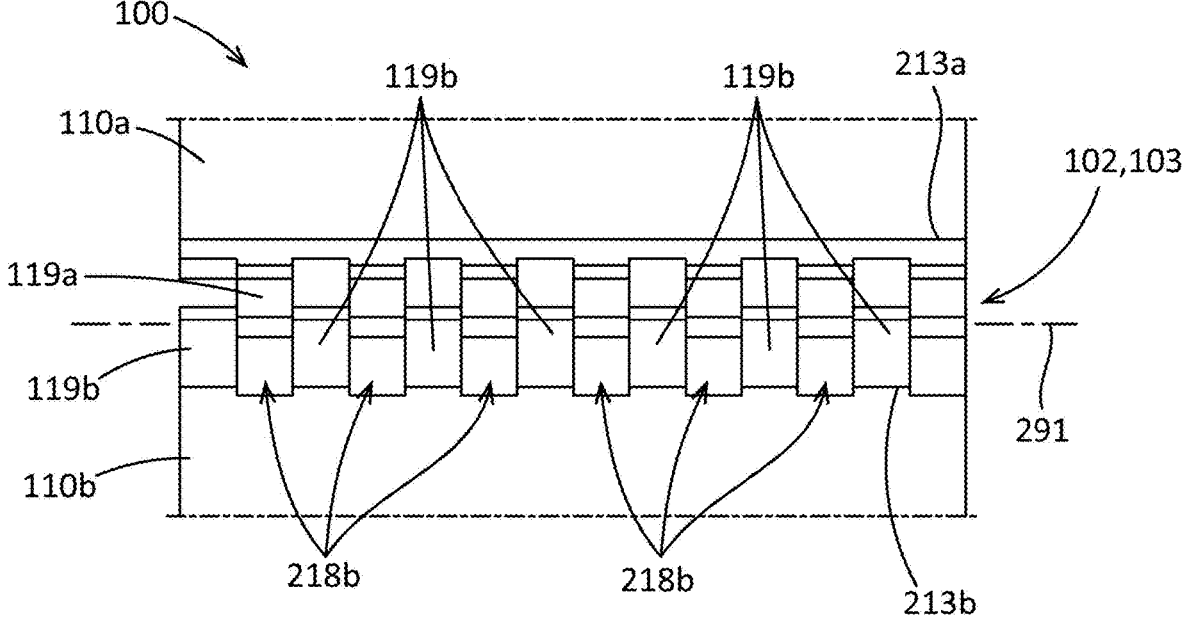
FIG. 7 is a detail side view of the hinge side of the tapping sleeve of FIG. 1.
Figure 8:
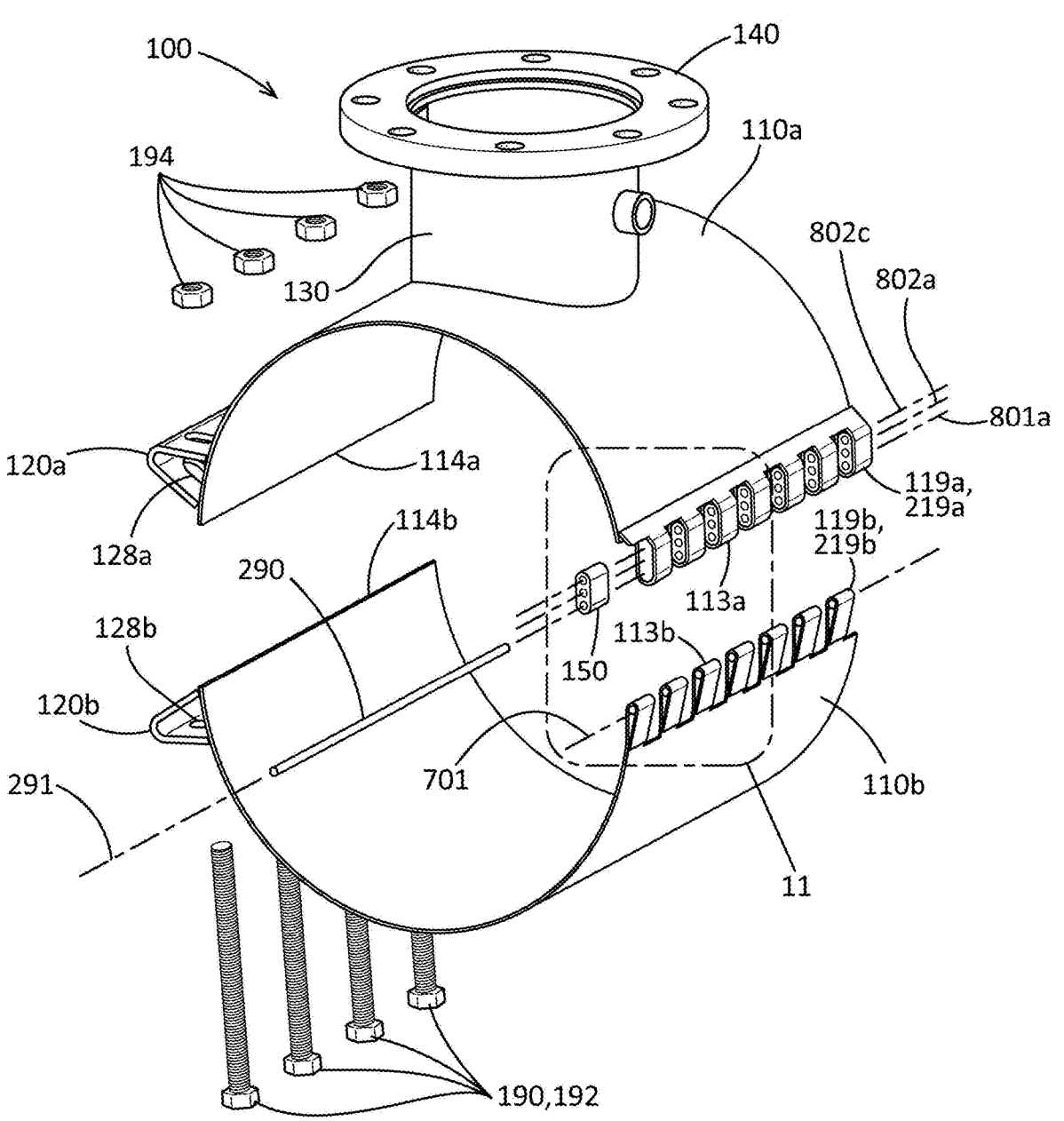
FIG. 8 is an exploded perspective view of the hinge side of the tapping sleeve of FIG. 1.

FIGS. 1-12 show a clamping device or tapping sleeve 100 in accordance with various aspects of the current disclosure in which the tapping sleeve 100 can comprise a sleeve or insert 150. The tapping sleeve 100 can define an axis 101 and can be sized to fit over a pipe element 80 (shown in FIG. 2). More specifically, the tapping sleeve 100 can be sized to match a radius of the pipe element 80 when in a tightened or assembled condition, position, or configuration. As shown, the tapping sleeve 100 can comprise one or more sleeves or sleeve portions such as the sleeve portions 110a,b. In some aspects, the two sleeve portions 110a,b can be joined together by a single hinge 102 on a hinge side 103. In some aspects, "n" sleeve portions 110 can be joined by "n−1 hinges. For example, three sleeve portions 110 can be joined together by two hinges 102 and a connection 104, four sleeve portions can be joined together by three hinges 102 and the connection 104, and so forth. The sleeve portions 110a,b can be joined together by the connection 104 comprising one or more connectors 190 (e.g., comprising bolts and nuts) on a connection side 105. This hinge 102 can comprise one or more connecting elements 290 (e.g., a pin, as shown in FIG. 8). In some aspects, the hinge 102 can comprise one or more of the inserts 150. Either or both of the one or more connecting elements 290 and the one or more inserts 150, where present, can be received within and captured by a retaining member or, more specifically, a retaining fold 119a,b. The one or more connecting elements 290 can be moved between a plurality of mounting bores 158 on the inserts 150 to move a center of rotation of the hinge 102 up or down relative to a surrounding portion of the tapping sleeve 100 such as, for example and without limitation, the sleeve portion 110a comprising the inserts 150. An overall form of the hinge 102 can be similar to that of a piano or door hinge.

Figure 16A:
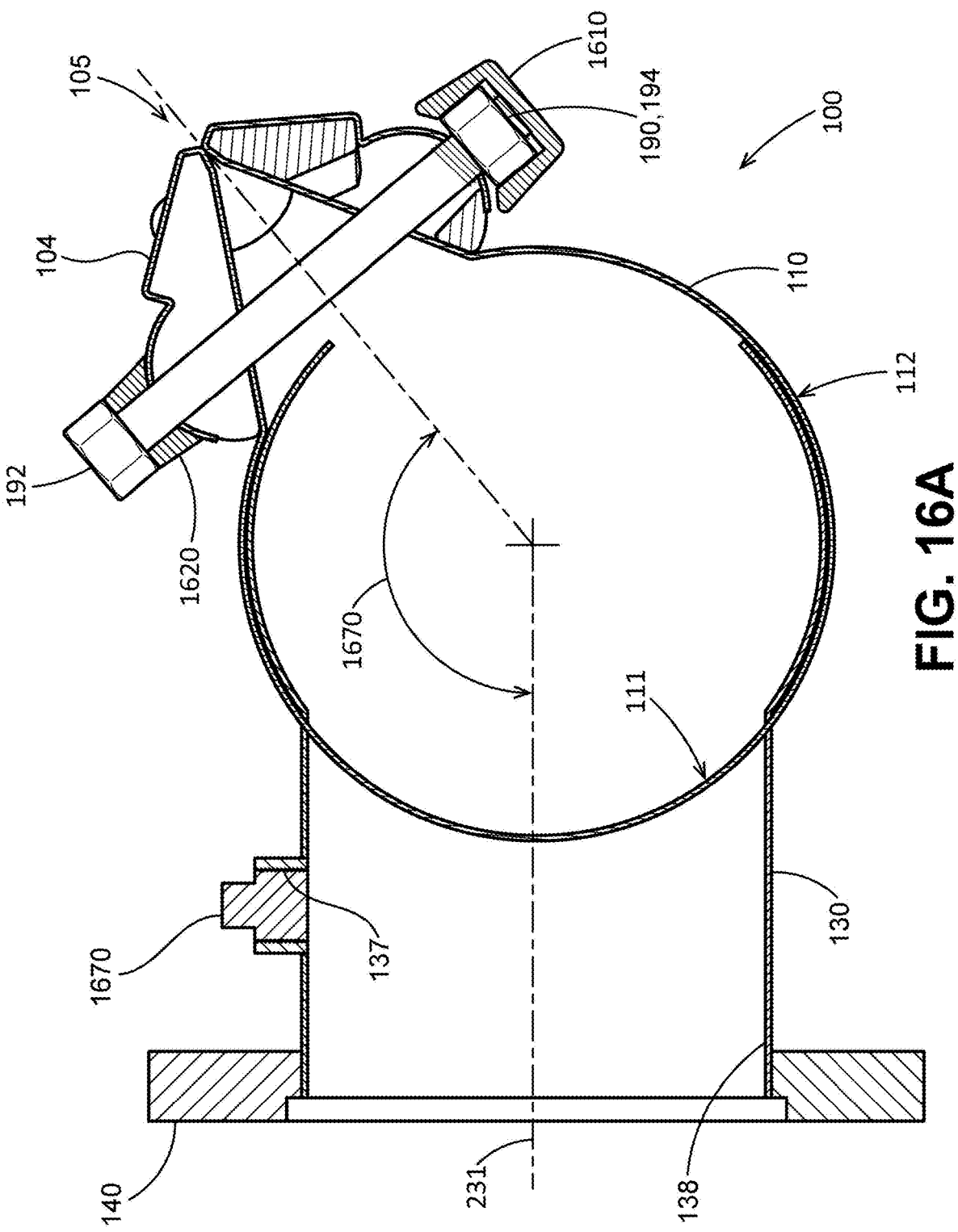
FIG. 16A is a sectional view of a tapping sleeve in accordance with another aspect of the current disclosure.

As shown in FIG. 1, a top perspective view of the connection side 105 of the tapping sleeve 100 in accordance with one aspect of the current disclosure, the tapping sleeve 100 can comprise the aforementioned sleeve portion 110a, which can be an outlet band or first band or first sleeve portion. As shown, the tapping sleeve 100 can further comprise the sleeve portion 110b, which can be a cap band or second band or second sleeve portion and can be joined or secured to the sleeve portion 110a. In some aspects, as shown in FIG. 16A, the tapping sleeve 100 can comprise a single sleeve portion 110. In some aspects, as shown in FIG. 1, the tapping sleeve 100 can comprise two and only two sleeve portions such as, for example and without limitation, the sleeve portions 110a,b. In some aspects, the tapping sleeve 100 can comprise three or more sleeve portions 110.

Each of or either of the sleeve portions 110a,b can define a respective arcuate portion or middle portion 117a,b. In some aspects, each of or either of the arcuate portions 117a,b can be continuously formed from a single sheet of material. In some aspects, as exemplarily shown in FIG. 15A, each of or either of the entire sleeve portions 110a,b can be continuously formed from a single sheet of material. More specifically, each of or either of the sleeve portions 110a,b or a portion thereof, e.g., the arcuate portion 117a and/or flanges 120a,b, can be continuously or monolithically formed from a single sheet or piece of sheet metal, such as a single sheet of steel, a single sheet of aluminum, a single sheet of copper, or any one of various other types of sheet metal. In some aspects, one or both of the flanges 120a,b can be a retaining member such as a retaining member or retaining fold 1520b shown in FIG. 15A. More specifically, the flange 120a,b can extend at least in part in a radial direction of the tapping sleeve 100. Each of or either of the sleeve portions 110a,b can comprise or define a first side end 113a,b, a second side end 114a,b, a first axial end or front end 115a,b, and a second axial end or back end 116a,b. Each of or either of the arcuate portions 117a,b can itself comprise or define a first side end, a second side end, a first axial end or front end, and a second axial end or back end, one or more of which can be coincident with the respective first side end 113a,b, the second side end 114a,b, the first axial end 115a,b, and the second axial end 116a,b or can be separately defined.

Figure 2:
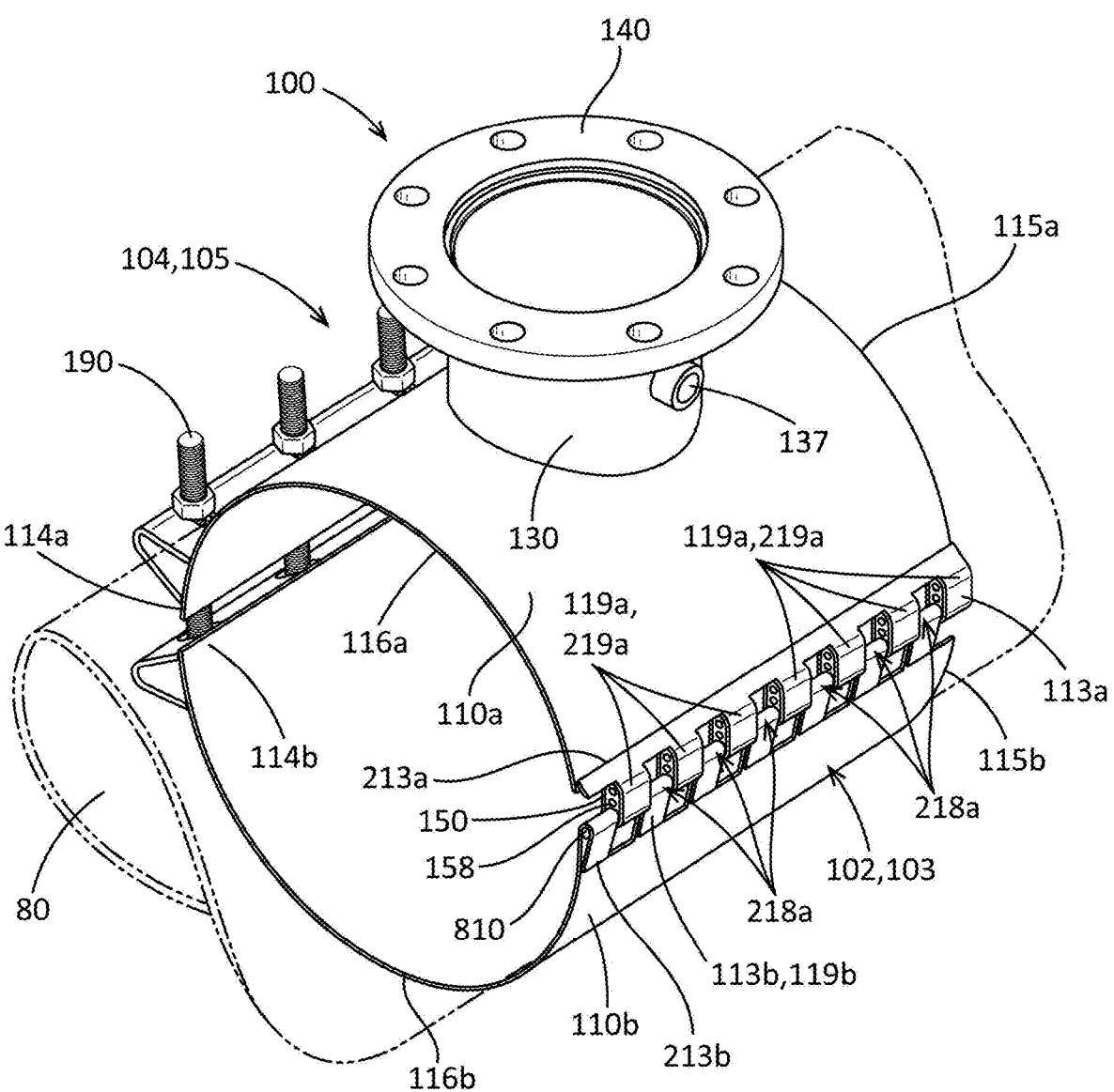
FIG. 2 is a top perspective view of a hinge side of the tapping sleeve of FIG. 1.

In some aspects, each of or either of the arcuate portions 117a,b can be dimensioned or otherwise sized and shaped such that the respective sleeve portion 110a,b can be positioned on a pipe element 80 (shown in FIG. 2). In some aspects, the arcuate portions 117a,b can extend from the first side end 113a,b to the second side end 114a,b. In some aspects, the arcuate portions 117a,b can subtend an arc of approximately 180°. In some aspects, the arcuate portions 117a,b can subtend various other angular extents, such as, for example and without limitation, from between about 90° to about 180°, or various other angular extents. In some aspects, each of or either of the arcuate portions 117a,b can subtend the same angular distance. In some aspects, the arcuate portions 117a,b need not subtend the same angular distance. In some aspects, the arcuate portions 117a,b can together subtend a total angular distance of 360 degrees or an entire circumference of the tapping sleeve 100. In some aspects, the arcuate portions 117a,b or, more generally, the sleeve portions 110a,b can overlap each other in a circumferential direction. In some aspects, the arcuate portion 117b of the sleeve portion 110b can be substantially similar to the arcuate portion 117a of the sleeve portion 110a.

In some aspects, each of or either of the sleeve portions 110a,b can comprise or define a corresponding outlet flange or flange 120a,b, which can be defined proximate to or, as shown, can define the respective second side end 114a,b of the respective sleeve portion 110a,b. In some aspects, as shown, the flange 120a can define a plurality of securing bores 128a,b (one instance of the securing bore 128a exemplarily shown in FIG. 1, and one instance of the securing bore 128b exemplarily shown in FIG. 5). In some aspects, each of or either of the flanges 120a,b can define just a single securing bore 128a,b or one for each connector 190. As shown, each of the flanges 120a,b can define four respective securing bores 128a,b. Referring to FIG. 2, the securing bores 128a,b can be exemplarily defined through the respective flanges 120a,b from a top surface or outer surface 112a,b of the respective sleeve portion 110a,b to a bottom surface or inner surface 111a,b of the respective sleeve portion 110a,b.

In some aspects, each of or either of the flanges 120a,b, which can be define a V-shape in cross-section and can be a V-lug, can comprise one or more panels such as, for example and without limitation, a first panel 123 and a second panel 125. The first panel 123 and the second panel 125 can be joined by a connecting panel 124. As shown, the first panel 123 and the second panel 125 can be planar or substantially so, and the connecting panel 124 can be non-planar, e.g., radiused or rounded. Each of or either of the flanges 120a,b and, more specifically, one or both of the panels 123,125 can be welded to the corresponding arcuate portion 117a,b. More specifically, one or both of the panels 123,125 can be welded to the corresponding arcuate portion 117a,b at an intersection between the welded features. In some aspects, each of or either of the flanges 120a,b can define another shape in cross-section. In some aspects, as will be described below, each of or either of the flanges 120a,b can be formed integrally with the corresponding arcuate portion 117a,b and can thereby form a monolithic sleeve portion 110a,b.

The sleeve portion 110b can be positioned relative to the sleeve portion 110a such that the securing bores 128a, which can be first securing bores, are aligned with the securing bores 128b, which can be second securing bores. As shown, the sleeve portion 110b can at least in part be attached to the sleeve portion 110a with connectors or fasteners 190. For example and without limitation, it is contemplated that the connectors 190 can be selected from the group including, but not limited to, nuts and bolts, pins, screws, hooks, and various other attachment mechanisms. As shown, each of or any of the connectors 190 can comprise a first portion 192, which can be a bolt and can be positioned through or can extend through the respective securing bores 128a,b. Each of or any of the connectors 190 can be secured within the respective securing bores 128a,b through the use of a second portion 194, which can be a mating fastener, e.g., a nut. In some aspects, the connectors 190 can comprise a shoulder 1595 (shown in FIG. 15B) or a capture element or cover 1610 (shown in FIG. 16B) to further secure the connectors 190 in the respective securing bores or, more generally, in the tapping sleeve 100.

As shown, a tapping bore 118 can be formed in the arcuate portion 117a of the sleeve portion 110a between the first side end 113a and the second side end 114a and, more specifically, between the first side end 113a and the flange 120a. The tapping bore 118 can extend through the sleeve portion 110a from the outer surface 112a to the inner surface 111a.

In various aspects, the tapping sleeve 100 and, more specifically, the first sleeve portion 110 can comprise a neck 130. The neck 130 can be coupled or secured to the sleeve portion 110a. The neck 130 can extend from the sleeve portion 110a. For example and without limitation, the neck 130 can be welded to the sleeve portion 110a. As shown, the neck 130 can comprise a side wall 133 having a first end 135 and a second end 136. More specifically, the side wall 133 can comprise an inner surface 131 and an outer surface 132. The inner surface 131 can define a neck bore 138, which can extend from the first end 135 to the second end 136. In some aspects, the side wall 133 can define a cylindrical shape, and the neck bore 138 can define a substantially cylindrical bore or can define a circular shape in cross-section. In some aspects, the side wall 133 and the neck bore 138 can define any one of other geometric shapes. The neck bore 138 can be in fluid communication with the tapping bore 118.

In some aspects, the neck 130 can define a plug bore 137 in the side wall 133. In this aspect, the plug bore 137 can extend through the side wall 133 from the inner surface 131 to or towards the outer surface 132. In some aspects, a plug 1670 (shown in FIG. 16A) can be positioned in the plug bore 137 and the plug bore 137 can be selectively sealed or opened to the neck bore 138. In one aspect, the neck 130 can also comprise a neck flange 140 at or proximate to the second end 136. In some aspects, the neck flange 140 can define a plurality of connection holes 148. In some aspects, the neck flange 140 can define a single connection hole 148. In some aspects, the neck flange 140 can provide a location at which a pipe element (not shown) of a branch line (not shown) can be attached and secured to the tapping sleeve 100. It is contemplated that connectors or fasteners, such as, for example and without limitation, nuts and bolts, screws, pins, and various other types of connectors can be utilized with the connection holes 148 to secure the pipe element of the branch line to the tapping sleeve 100. It is contemplated that the neck 130 can be configured as various types of outlets. For example and without limitation, the neck 130 can be a mechanical joint outlet, a plain end outlet, a flanged outlet, or any one of various other types of outlets. Moreover, each of the tapping bore 118 and the neck bore 138 can be configured to receive a tool for tapping into the pipe element 80.

FIG. 2 is a top perspective view of a hinge side 103 of the tapping sleeve 100 of FIG. 1. Again, as shown, the tapping sleeve 100 can be sized to fit over the pipe element 80 and can comprise one or more of the inserts 150, which can define the plurality of mounting bores 158. Each of or any of the mounting bores 158 can be sized to selectably receive, by selection of a user or a manufacturer of the tapping sleeve 100 or any portion thereof, the connecting element 290. The insert 150—or the plurality of inserts 150, as shown—can be positioned proximate to the first side end 113a of the first sleeve portion 110a. The one or more retaining folds 119a,b, each of or either of which can receive at least a portion of the insert 150 or a portion of the connecting element 290 therein, can be formed monolithically from a material forming a surrounding portion of the first sleeve portion 110a,b such as, for example and without limitation, the arcuate portion 117a,b. In some aspects, The one or more retaining folds 119a,b can be formed monolithically from a material forming the entire first sleeve portion 110a,b including the arcuate portion 117a,b and the flange 120a,b.

As shown, the first sleeve portion 110a can comprise a plurality of inserts 150. Each of or any of the inserts 150 can be received within a corresponding retaining fold 119a, which again can be defined by a corresponding tab 219a of each of a plurality of tabs 219a and, more generally, by the first side end 113a of the first sleeve portion 110a. Each tab 219 or 219a,b can have a constant width. In some aspects, as shown, the tabs 219a can be joined at a terminal end 213a of the material forming the first side end 113a. In some aspects, the tabs can remain separated through the terminal end 213a. Adjoining tabs 219a of the plurality of tabs 219a can define a gap 218a therebetween. Each of the gaps 218a can be sized to receive at least a portion of the first side end 113b of the second sleeve portion 110b.

Similarly, in some aspects, the second sleeve portion 110b can comprise a plurality of inserts 150. Each of or any of the inserts 150 can be received within a corresponding retaining fold 119b, which again can be defined by a corresponding tab 219b of each of a plurality of tabs 219b and, more generally, by the first side end 113b of the second sleeve portion 110b. In some aspects, as shown, the second sleeve portion 110b and, more specifically, the retaining folds 119b need not receive any insert 150 therein. In some aspects, the tabs 219a can be joined at a terminal end 213b of the material forming the first side end 113a. In some aspects, as shown, the tabs can remain separated through the terminal end 213b. With or without the inserts 150, adjoining tabs 219b of the plurality of tabs 219b can define a gap 218b (shown in FIG. 7) therebetween. Each of or any of the gaps 218b can be sized to receive at least a portion of the first side end 113a of the first sleeve portion 110a.

The retaining folds 119a,b and the respective tabs 219a,b of the hinge 102 of the tapping sleeve 100 can thus alternate across an axial length of the tapping sleeve 100—a first tab 219a forming a first retaining fold 119a in the first sleeve portion 110a, then a first tab 219b forming a first retaining fold 119b in the second sleeve portion 110b, then a second tab 219a forming a second retaining fold 119a in the first sleeve portion 110a, then a second tab 219b forming a second retaining fold 119b in the second sleeve portion 110b, and so forth. The alternative retaining folds 119a,b and tabs 219a,b and gaps 218a,b defined thereby can thus allow a nesting or meshing of the first side ends 113a,b of the sleeve portions 110a,b.

The connecting element 290 can then extend through both of the first side ends 113a,b and thereby fix the sleeve portions 110a,b to each other. The one or more connecting elements 290 can be moved between a plurality of mounting bores 158 on the inserts 150 to move a center of rotation of the hinge 102 up or down relative to a surrounding portion of the tapping sleeve 100 such as, for example and without limitation, the sleeve portion 110a comprising the inserts 150.

Figure 3:
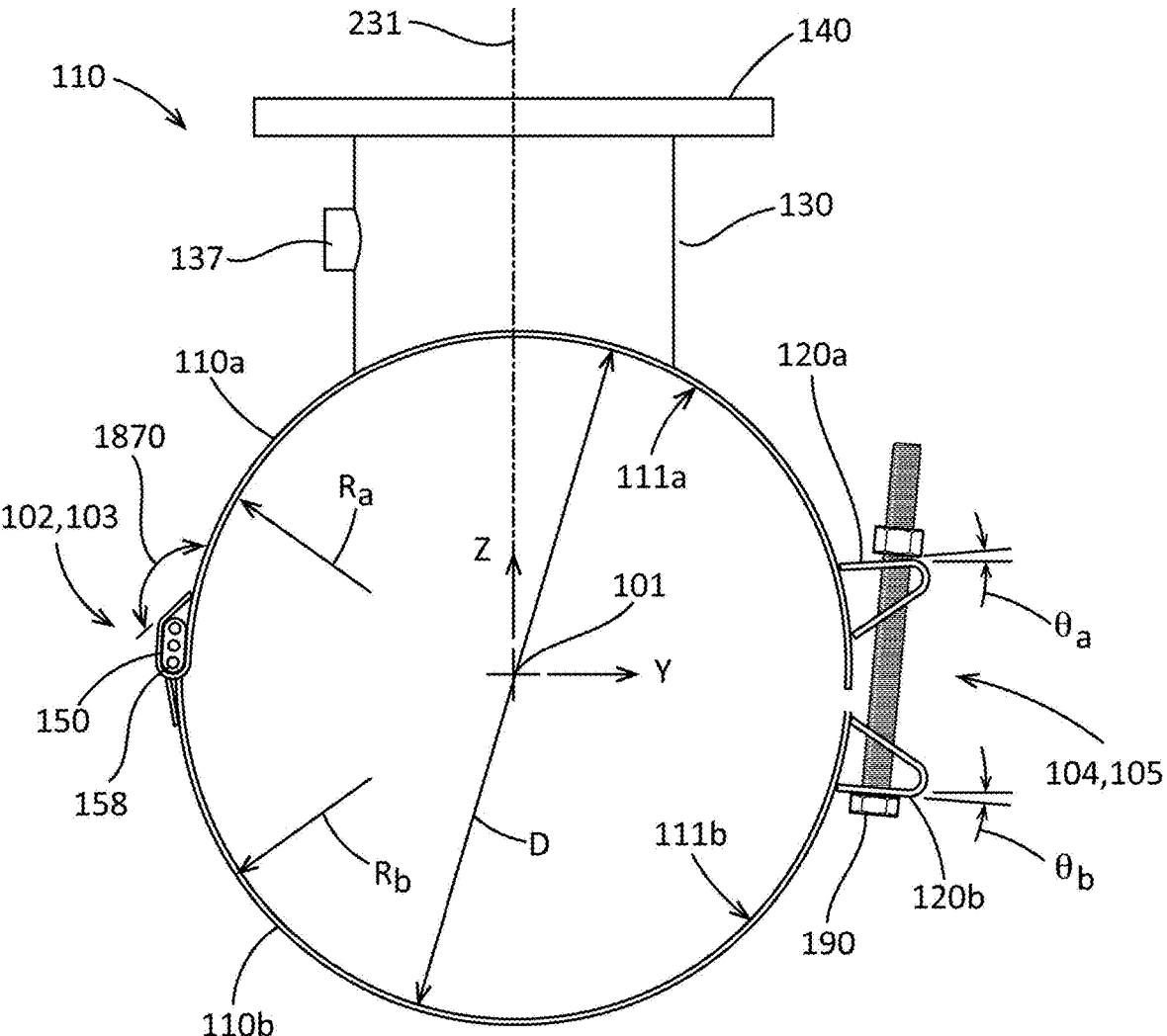
FIG. 3 is an end view or front view of the tapping sleeve of FIG. 1.

FIG. 3 is an end view or front view of the tapping sleeve 100 of FIG. 1. As shown, the arcuate portion 117a of the sleeve portion 110a can define a curved profile that is configured such that the inner surface 111a of the sleeve portion 110a is positionable or configurable around at least a portion of the pipe element 80 (shown in FIG. 2). In a further aspect, the arcuate portion 117b of the first sleeve portion 110b can also define a curved profile that is configured such that the outer surface 112b of the second sleeve portion 110b is positionable or configurable around at least a portion of the pipe element 80.

In one aspect, the tapping sleeve 100 and, more specifically, each of or either of the sleeve portions 110a,b can, at least with the side ends 113a,b,114a,b of each of the sleeve portions 110a,b aligned horizontally, define the X-axis direction and the Y-axis direction for the respective sleeve portions 110a,b. In various aspects, when so oriented, the first outlet flange 120a can be angled at an angle $\theta_a$ with respect to the Y-axis direction and the second outlet flange 120b can be angled at an angle $\theta_b$ with respect to the Y-axis direction. In some aspects, the angles $\theta_a,\theta_b$ can range from between about 0° to about 20°. In some aspects, the angles $\theta_a,\theta_b$ can range from between about 0° to about 10°. In some aspects, the angles $\theta_a,\theta_b$ can range from between about 0° to about 5°. In some aspects, the angle $\theta_a$ can be the same as the angle $\theta_b$ or, optionally, the angle $\theta_a$ can be different than the angle $\theta_b$. Depending on the angles $\theta_a,\theta_b$, in some aspects the first outlet flange 120a can be angled with respect to the second outlet flange 120b. In some aspects, the first outlet flange 120a can be parallel with the second outlet flange 120.

As shown, an axis 231 defined by the neck 130 can extend through or intersect the axis 101 of the tapping sleeve. In some aspects, as shown, the axis 231 can be aligned with the Z-axis direction. In some aspects, the axis 231 can be angled with respect to the Z-axis direction. Each of or either of the sleeve portions 110a,b and, more specifically, the inner surfaces 111a,b thereof can define respective inner radii $R_{a,b}$. The assembled tapping sleeve 100 can define an effective inside diameter D, which can be the average inside diameter of the assembled tapping sleeve 100 or the inside diameter of the assembled tapping sleeve 100 when those portions of the sleeve portions 110a,b and, more specifically, the inner surfaces 111a,b that in an assembled condition can be made concentric to the pipe element 80 (shown in FIG. 2) when received within the tapping sleeve 100 are made concentric to the pipe element 80.

Figure 4:
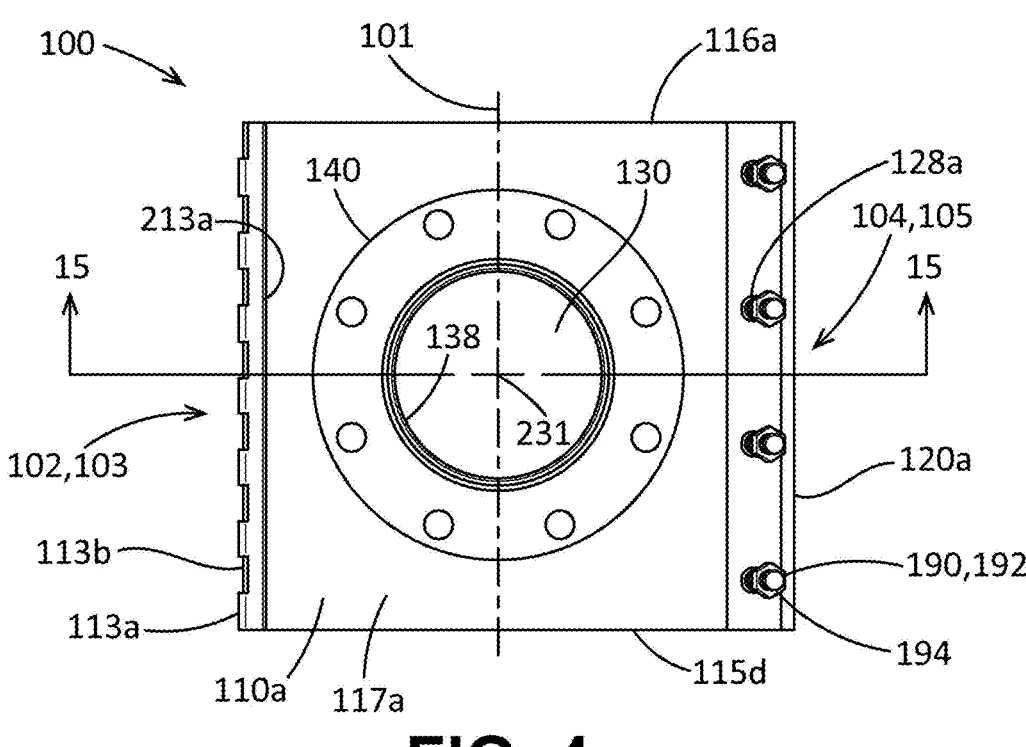
FIG. 4 is a top view of the tapping sleeve of FIG. 1.
Figure 5:
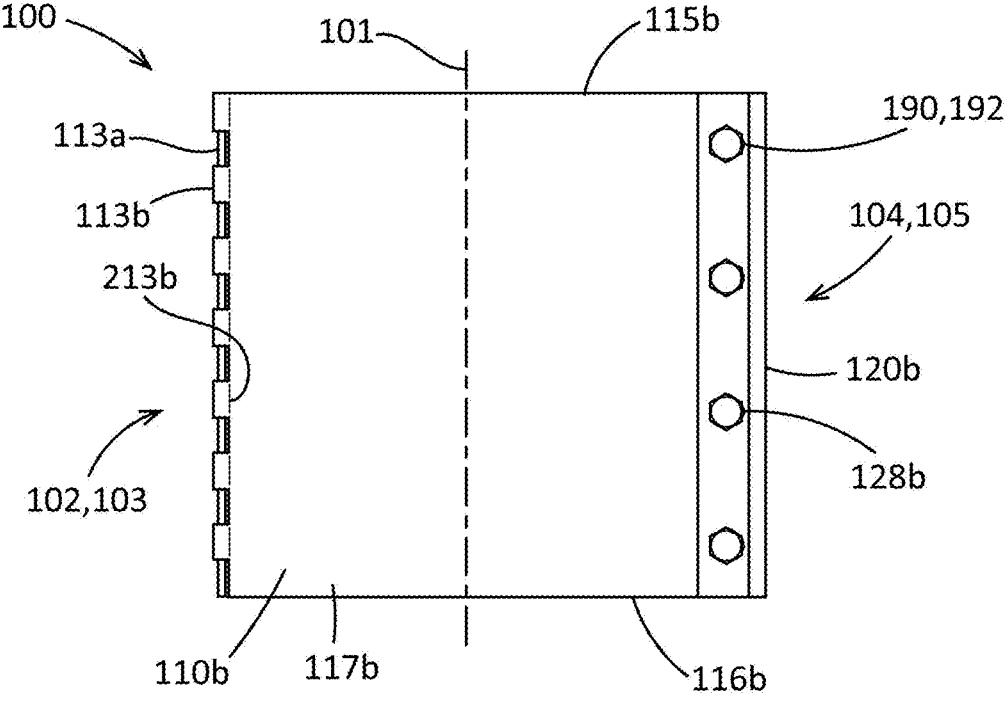
FIG. 5 is a bottom view of the tapping sleeve of FIG. 1.

FIG. 4 is a top view and FIG. 5 is a bottom view of the tapping sleeve 100 of FIG. 1. As shown, the axial ends 115a and 116a can be orthogonal to the axis 101, and the axial ends 115b and 116b can similarly be orthogonal to the axis 101 of the tapping sleeve 100. A spacing in the axial direction or X-axis direction between centers of adjacent connectors 190 can be constant. Likewise, a spacing in the axial direction or X-axis direction between centers of adjacent retaining folds 119a and between centers of adjacent retaining folds 119b can be constant.

FIG. 6 is a detail side view of the connection side 105 of the tapping sleeve 100 of FIG. 1. Each of or any of the connectors 190 can be positioned such that the second portion 194 (e.g., the nut) is engageable with one of the first flange 120a of the sleeve portion 110a and the second flange 120b of the sleeve portion 110b. The first portion 192 (e.g., a head of the bolt) of the connector 190 can be engageable with one of the first flange 120a and the second flange 120b to which the second portion 194 is not engaged.

FIG. 7 is a detail side view of the hinge side 103 of the tapping sleeve 100 of FIG. 1. Again, as shown, the retaining folds 119a (only one instance labeled) and the retaining folds 119b can alternate across an axial length of the hinge 102. The connecting element 290 can extend through the hinge 102 and through each of the retaining folds 119a,b along a connection axis 701 defined by the path followed by the connecting element 290 where it extends through the first side ends 113a,b of the respective sleeve portions 110a,b.

FIG. 8 is an exploded perspective view of the hinge side 103 of the tapping sleeve 100 of FIG. 1. Again, the connecting element 290 can join the first side end 113*a* of the first sleeve portion 110 to the first side end 113*b* of the second sleeve portion 110*b*. In some aspects, the connecting element 290 can be rigid. In some aspects, the connecting element 290 can be flexible. In some aspects, the connecting element 290 can define a circular or rounded shape in cross-section. In some aspects, the connecting element 290 can define a polygonal shape in cross-section (e.g., square, triangular, or star). In some aspects, a cross-sectional size or shape of the connecting element 290 can vary along an axial length of the connecting element 290, especially if proper function is maintained. In some aspects, the connecting element 290 can be or can comprise a pin. In some aspects, the connecting element 290 can be a long bolt configured to remain in position by itself. In some aspects, the connecting element 290 can be a wire or cable or rope and need not be rigid or non-flexible, at least during use. In some aspects, the connecting element 290 can be formed from metal. In some aspects, the connecting element 290 can be made from rubber, plastic, or other materials.

The one or more connecting elements 290 are not limited in number or size (length or cross-sectional area) and can vary if proper function of the hinge 102 is maintained. When using multiple connecting elements 290, the connecting elements 290 can be aligned along a single connection axis 701.

As shown, the connecting element 290 defining the axis 291 can extend along any one of multiple mounting bore axes 801*a,b,c* defined by mounting bores 158*a,b,c* (shown in FIG. 9), the chosen mounting bore axes 801*a,b,c* determining, at least in part, the effective inside diameter D (shown in FIG. 3) of the assembled tapping sleeve 100. The connecting element 290 can further extend along the mounting bore axis 801 or one of multiple mounting bore axes 801*a,b,c* (shown in FIG. 14B) of the second sleeve portion 110*b*. The hinge 102 of the tapping sleeve 100 can define any one of multiple assembled conditions. For example, when the tapping sleeve 100 is assembled with the connecting element 290 extending along the mounting bore axis 801*a*, the tapping sleeve 100 can define a first assembled condition; when the tapping sleeve 100 is assembled with the connecting element 290 extending along the mounting bore axis 801*b*, the tapping sleeve 100 can define a second assembled condition; and when the tapping sleeve 100 is assembled with the connecting element 290 extending along the mounting bore axis 801*c*, the tapping sleeve 100 can define a third assembled condition. A position of the first sleeve portion 110*a* with respect to the second sleeve portion 110*b* in a circumferential direction of the tapping sleeve 100 can be different between two of the assembled conditions. As shown, the tapping sleeve 100 can be largest or can define the largest effective inside diameter D when the connecting element 290 extends along the mounting bore axis 801*a*, and the tapping sleeve 100 can be smallest or can define the smallest effective inside diameter D when the connecting element 290 extends along the mounting bore axis 801*c*.

Figure 9:
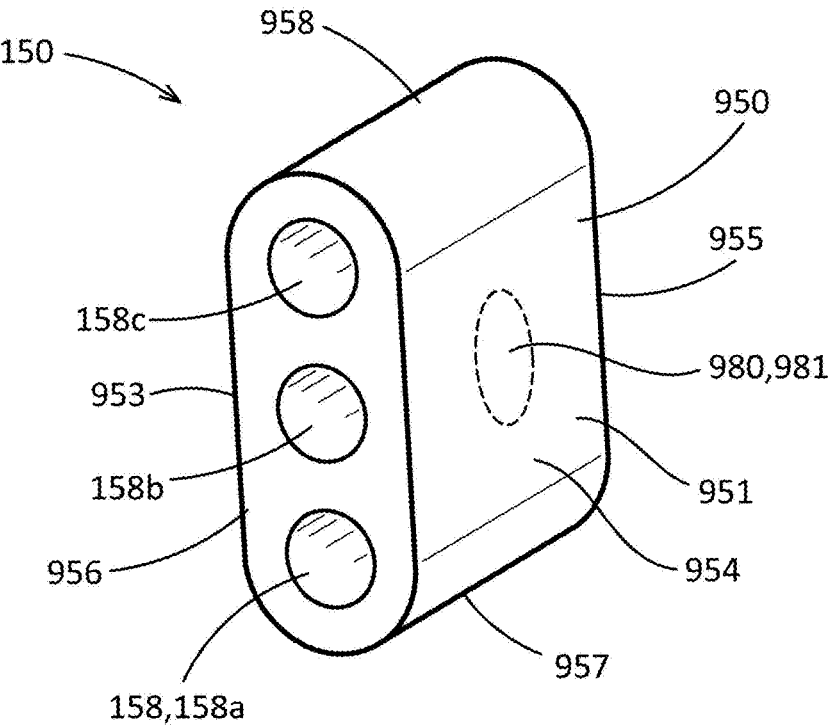
FIG. 9 is a perspective view of an insert of the tapping sleeve of FIG. 1.

FIG. 9 is a perspective view of an insert 150 of the tapping sleeve 100 of FIG. 1. The insert 150 can comprise a body 950. The body 950 can define a first side or outer side 953 and a second side or outer side 954. The body 950 can define a first side end or first axial end 955 and a second side end or second axial end 956. The body 950 can define a first end or first circumferential end 957 and a second end or second circumferential end 958. The body 950 can define one or more mounting bores 158 such as, for example and without limitation, the mounting bores 158*a,b,c*. Each of or any of the mounting bores 158*a,b,c* can define a cylindrical surface or a circular shape in cross-section. The body 950 and, more generally, the insert 150 can define a constant shape in cross-section.

The insert 150 can define a locking feature 980, which can engage at least a portion of a corresponding retaining fold 119*a,b* of the respective sleeve portion 110*a,b* upon assembly and thereby fix a position of the insert 150 in the corresponding retaining fold 119*a,b*. The locking feature 980 can define a surface 981, which can be a portion of the surface 951 of the body 950. In some aspects, as shown, the locking feature 980 can protrude inward or towards a center of the center of the body 950 from the surface 951. In some aspects, the locking feature 980 can protrude outward or away from a center of the center of the body 950 from the surface 951. In some aspects, as shown, the locking feature 980 can be positioned between and away from the axial ends 955,956. In some aspects, the locking feature 980 can be positioned at or defined in the axial ends 955,956. In some aspects, the locking feature 980 can be defined in the inner side 953. In some aspects, the locking feature 980 can be defined in the outer side 954. In some aspects, the locking feature 980 can be defined anywhere in the surface 951 of the body 950 or, more generally, the insert 150. The locking feature 980 can be any shape configured to facilitate the aforementioned engagement with the corresponding retaining fold 119*a,b*. In some aspects, the locking feature 980 can be a dimple as shown.

Figure 10:
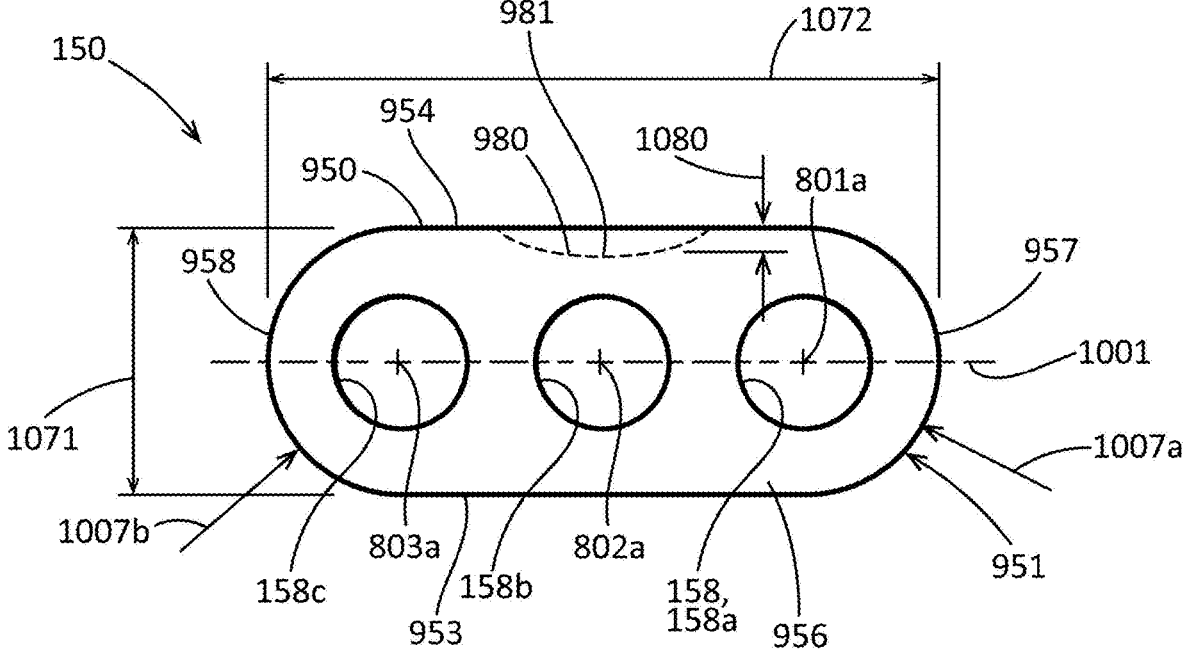
FIG. 10 is an end view of the insert of FIG. 9.

FIG. 10 is an end view of the insert 150 of FIG. 9. The insert and, more specifically, the body 950 thereof can define a width 1071 between the inner side 953 and the outer side 954 and can define a length 1072 between the first circumferential end 957 and the second circumferential end 958. As shown, the length 1072 can be greater than the width 1071. A portion of the surface 981 of the locking feature 980 can be offset from the surface 951 by a maximum distance 1080. The circumferential ends 957,958 of the insert 150 can define respective radii 1007*a,b*, which can be full radii with respect to the width 1071 or another corresponding portion of the insert 150. As shown, the mounting bore axes 158*a,b,c* can be aligned along a circumferential axis 1001 of the insert 150. In some aspects, as shown, a spacing between any two adjacent mounting bore axes 158*a,b,c* of the mounting bore axes 158*a,b,c* along the circumferential axis 1001 can be constant. In some aspects, such spacing can be variable.

Figure 11:
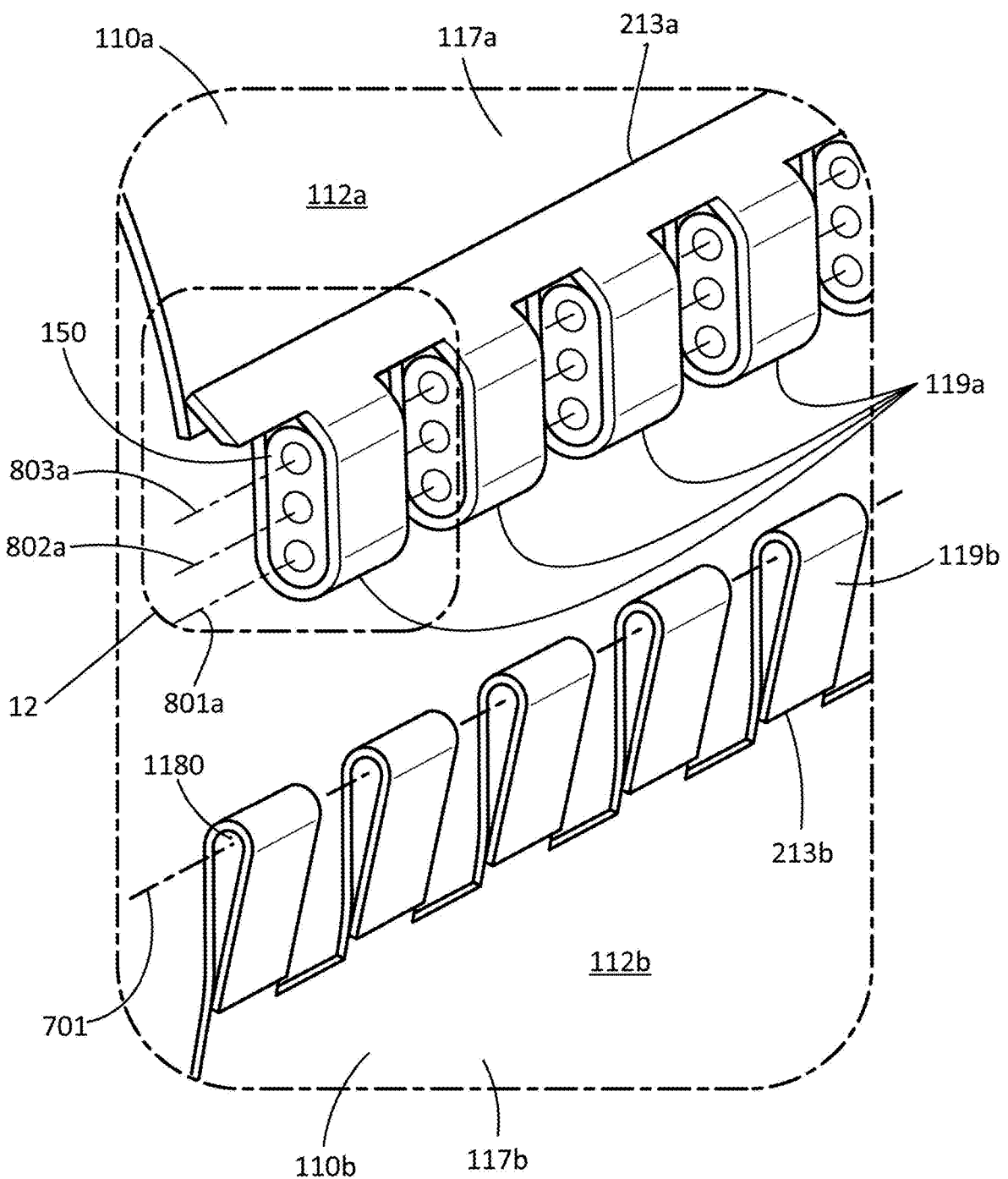
FIG. 11 is a detail exploded perspective view of the hinge side of the tapping sleeve of FIG. 1 taken from detail 11 of FIG. 8 but showing one instance of the insert that is shown separated from a corresponding retaining fold of the first sleeve portion in FIG. 8 received back within the corresponding retaining fold.

FIG. 11 is a detail exploded perspective view of the hinge side 103 of the tapping sleeve 100 of FIG. 1 taken from detail 11 of FIG. 8 but showing one instance of the insert 150 that is shown separated from a corresponding retaining fold 119*a* of the first sleeve portion 110*a* in FIG. 8 received back within the corresponding retaining fold 119*a*. In some aspects, one or more of the terminal ends 213*a,b* of the respective retaining folds 119*a,b* can be secured to a surrounding portion of the sleeve portions 110*a,b*, e.g., the arcuate portions 117*a,b*. More specifically, the terminal ends 213*a,b* can be so secured with a weldment or a separate fastener, which can be configured to be removed (e.g., a screw) or can be configured to not be removed (e.g., a rivet) from the assembly. As shown, one or more of the terminal ends 213*a,b* of the respective retaining folds 119*a,b* can contact a surrounding portion of the sleeve portions 110*a,b*, e.g., the arcuate portions 117*a,b*. As shown, each of the retaining folds 119*b* of the second sleeve portion 110*b* can define a mounting bore 1180, which can further define the mounting bore axis 801 along which the connecting element 290 (shown in FIG. 8) can be received.

Figure 12:
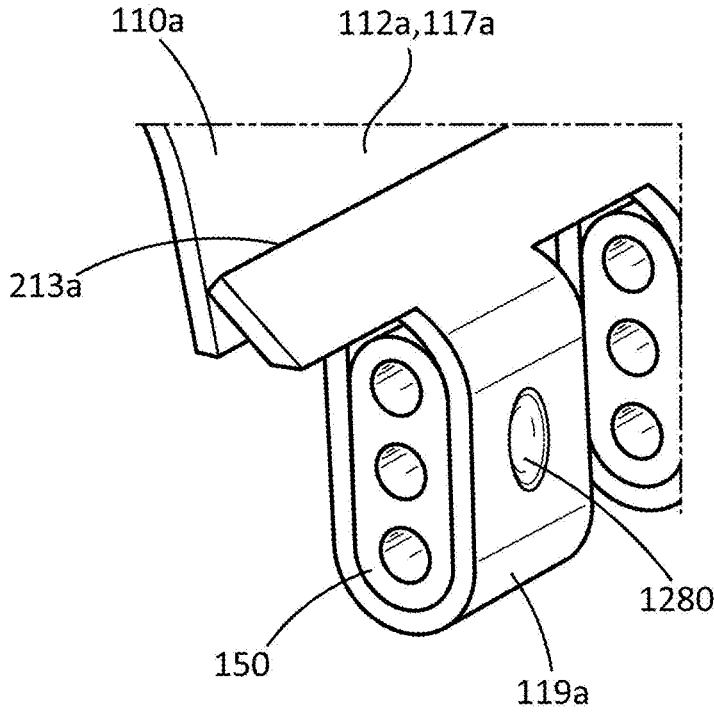
FIG. 12 is a detail perspective view of the insert of FIG. 9 taken from detail 12 of FIG. 11.

FIG. 12 is a detail perspective view of the insert 150 of FIG. 9 taken from detail 12 of FIG. 11. The retaining fold 119a can define a locking feature 1280, which can engage a locking feature 980 (shown in FIG. 9) of the insert 150. In some aspects, a position of the insert 150 with respect to a surrounding portion of the first sleeve portion 110a—or the sleeve portion 110b, as the case may be—can be maintained with any relationship between the parts immobilizing the one with respect to the others such as, for example and without limitation, a locking connection, which can be staked connection, or a friction fit. In some aspects, the inserts 150 can be retained in any one or more of a variety of other ways. In some aspects, the inserts 150 can be mechanically fixed in position (e.g., as shown in FIG. 12 with friction or with an adhesive that mechanically maintains a position of the insert 150). In some aspects, the inserts 150 can be chemically fixed in position (e.g., with an adhesive or a process that chemically bonds the mating materials). In some aspects, the inserts 150 can be metallurgically fixed in position (e.g., by relying on the properties of the metallic parts to facilitate bonding). In some aspects, the inserts 150 can be fixed in position in other ways or by a combination of methods.

The insert 150 can comprise any commonly accepted material used in the relevant field such as, for example and without limitation, metal, rubber, or plastic. In some aspects, as shown in FIGS. 1-12, the inserts 150 can be positioned on just one side of the hinge 102. In other aspects, the inserts 150 can positioned on both sides of the hinge 102 (replacing, for example, the retaining fold 119b of FIG. 1 with the retaining fold 119a and the matching inserts 150), further increasing the potential range of the hinge 102. The mounting bores 1180 can be integrated directly into the sleeve portion 110a,b itself via forming, casting, or other methods.

In some aspects, a sleeve portion 110a,b can be formed with "n" mounting bores 158 (representative of any number of the mounting bores 158a,b,c) or, at least in the case of the structures shown in FIGS. 13-20C, "n" mounting bores 1180 on one side of the hinge 102 to form at least "n" assembly conditions. In some aspects, each of two sleeve portions 110a,b can be formed with "n" mounting bores 158,1180, i.e., "n" mounting bores on each side of the hinge 102 to form "2n–1" assembly conditions, as exemplarily shown in FIGS. 20A-20C. Any number of inserts 150 and/or retaining folds 119 can extend across the axial length of the sleeve portion 110a,b. The number of inserts 150 and the number of mounting bores 158,1180 need not be equal on opposite sides of the hinge 102. For example and without limitation, as shown in FIG. 7, each side (and each sleeve portion 110a,b) of the hinge 102 can exemplarily comprise or define seven tabs.

FIGS. 13-20C show a tapping sleeve 100 in accordance with various aspects of the current disclosure not necessarily comprising the insert 150. Again, the tapping sleeve 100 can comprise two or more sleeves or sleeve portions such as the sleeve portions 110a,b and can be joined together by the hinge 102 and the connection 104. This hinge 102 can further comprise the one or more connecting elements 290. In some aspects, the connecting element 290 can be received within the corresponding sleeve portions 110a,b without the insert 150 positioned therebetween (i.e., between the connecting element 290 and the sleeve portions 110a,b). In some aspects, the tapping sleeve 100 can still comprise one or more inserts 150 and can be configured as shown. Again, the connecting element 290 and the one or more inserts 150, where present, can be received within and captured by the one or more corresponding retaining folds 119a,b.The inserts 150, where present, need not comprise the plurality of mounting bores 158.

Figure 13:
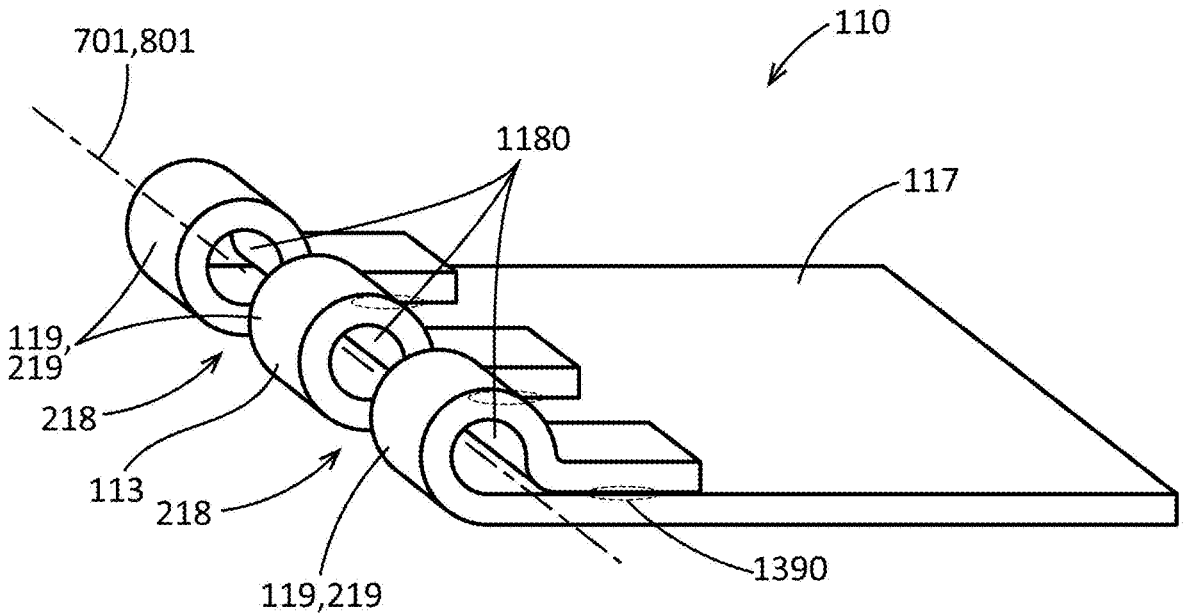
FIG. 13 is a side perspective view of one end of a sleeve portion of the tapping sleeve of FIG. 1 with the sleeve portion in a flattened condition except for a hinge portion thereof.

FIG. 13 is a side perspective view of a first side end 113 of a sleeve portion 110 of the tapping sleeve 100 of FIG. 1 with the sleeve portion 110 and, more specifically, the (typically) arcuate portion 117 in a flattened condition except for retaining folds 119 defined in the first side end 113. The sleeve portion 110 can represent either or both of the sleeve portions 110a,b. The first side end 113 of the sleeve portion 110 can define a plurality of the mounting bores 1180, each of which or any of which can be sized to selectably receive the connecting element 290. In some aspects, any bore such as the mounting bores 158 or the mounting bores 1180 shown can be circular in cross-section. In some aspects, any mounting bore such as the mounting bores 158 or the mounting bores 1180 shown can be non-circular in cross-section and can be any shape configured to lockably receive the connecting element 290 (shown in FIG. 8). More specifically, the retaining fold or retaining folds 119 can define each of or any of the plurality of mounting bores 1180.

The first side end 113 of the sleeve portion 110 can comprise a plurality of tabs 219, one or more of which can define a retaining fold 119 defining one of the mounting bores 1180. The mounting bores 1180 can define a common axis (e.g., the connection axis 701 and the mounting bore axis 801) along which the connecting element 290 can be received therein. Moreover, as described above, adjoining tabs 219 of the plurality of tabs 219 can defining a gap 218 therebetween, the gap 218 sized to receive at least a portion of the first side end 113 of a mating sleeve portion. As shown, a shape of the retaining fold 119 can be maintained during use of the sleeve portion and, more generally, the tapping sleeve 100 by a weld 1390. More specifically, the weld 1390 can be a spot weld.

Figures 14A, 14B:
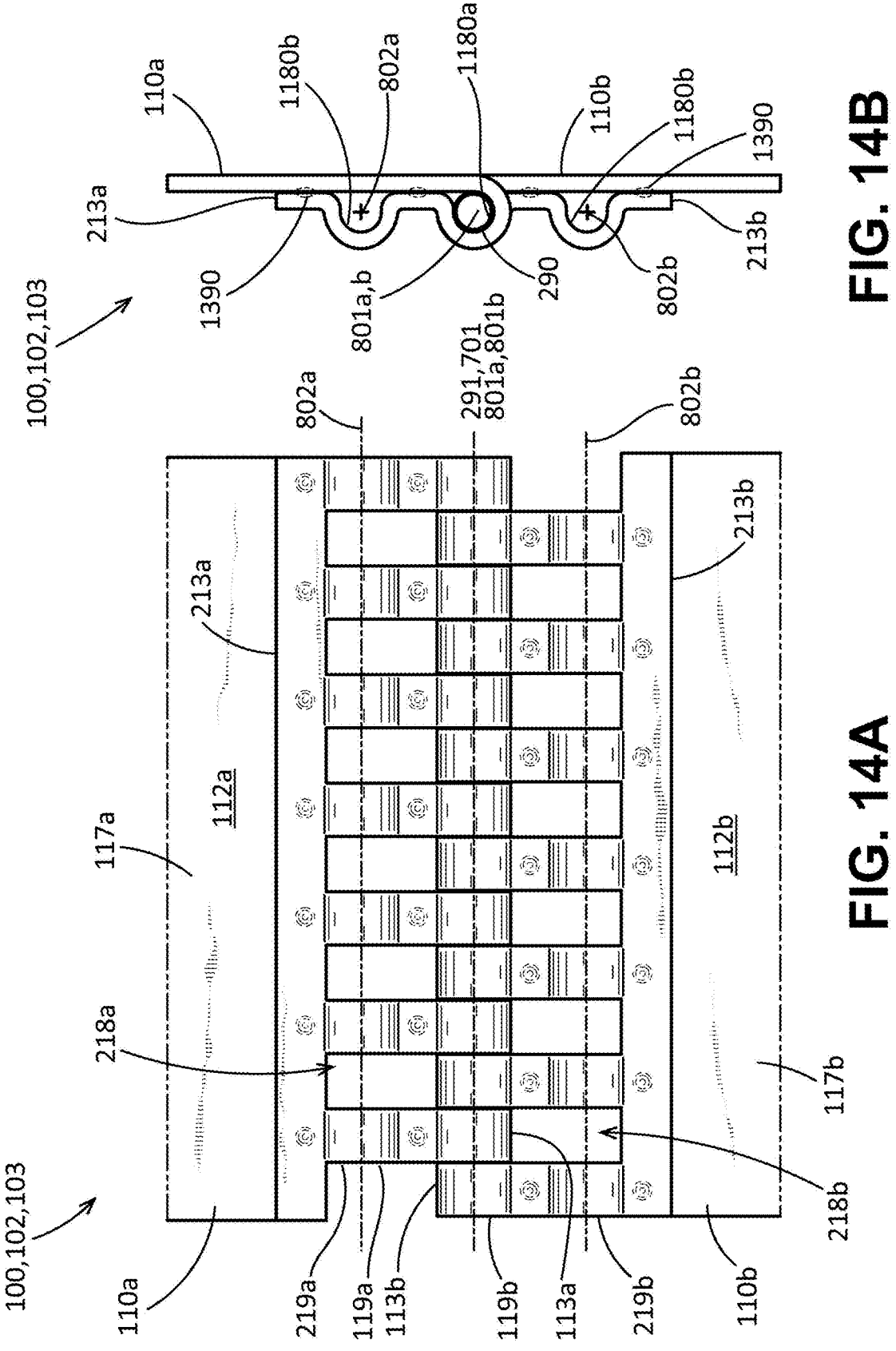
FIG. 14A is a detail side view of the hinge side of the tapping sleeve of FIG. 1 in accordance with another aspect of the current disclosure.
FIG. 14B is a sectional view of the hinge side of the tapping sleeve of FIG. 14A taken along line 14B-14B of FIG. 14A.

FIG. 14A is a detail side view of the hinge 102 of the hinge side 103 of the tapping sleeve 100 of FIG. 1 in accordance with another aspect of the current disclosure, and FIG. 14B is a sectional view of the hinge side 103 of the tapping sleeve 100 of FIG. 14A taken along line 14B-14B of FIG. 14A. The first side end 113a,b of each of or either of the first sleeve portion 110a and the second sleeve portion 110b can comprise a plurality of tabs 219a,b. Each tab 219a,b of the respective plurality of tabs 219a,b of the respective sleeve portion 110a,b can define the retaining fold 119a,b. The retaining folds 119a,b can define respective mounting bores 1180a,b (shown in FIG. 14B). The mounting bores 1180a,b of the plurality of tabs 219 can define common mounting bore axes 801a,b along which the connecting element 290 can be selectably received therein. Adjoining tabs 219a,b of the plurality of tabs 219a,b of the sleeve portions 110a,b can define the gaps 218a,b therebetween, and the gap 218a,b can be sized to receive at least a portion of the first side end 113a,b of the respective sleeve portions 110a,b.

Figures 15A, 15B, 15C:
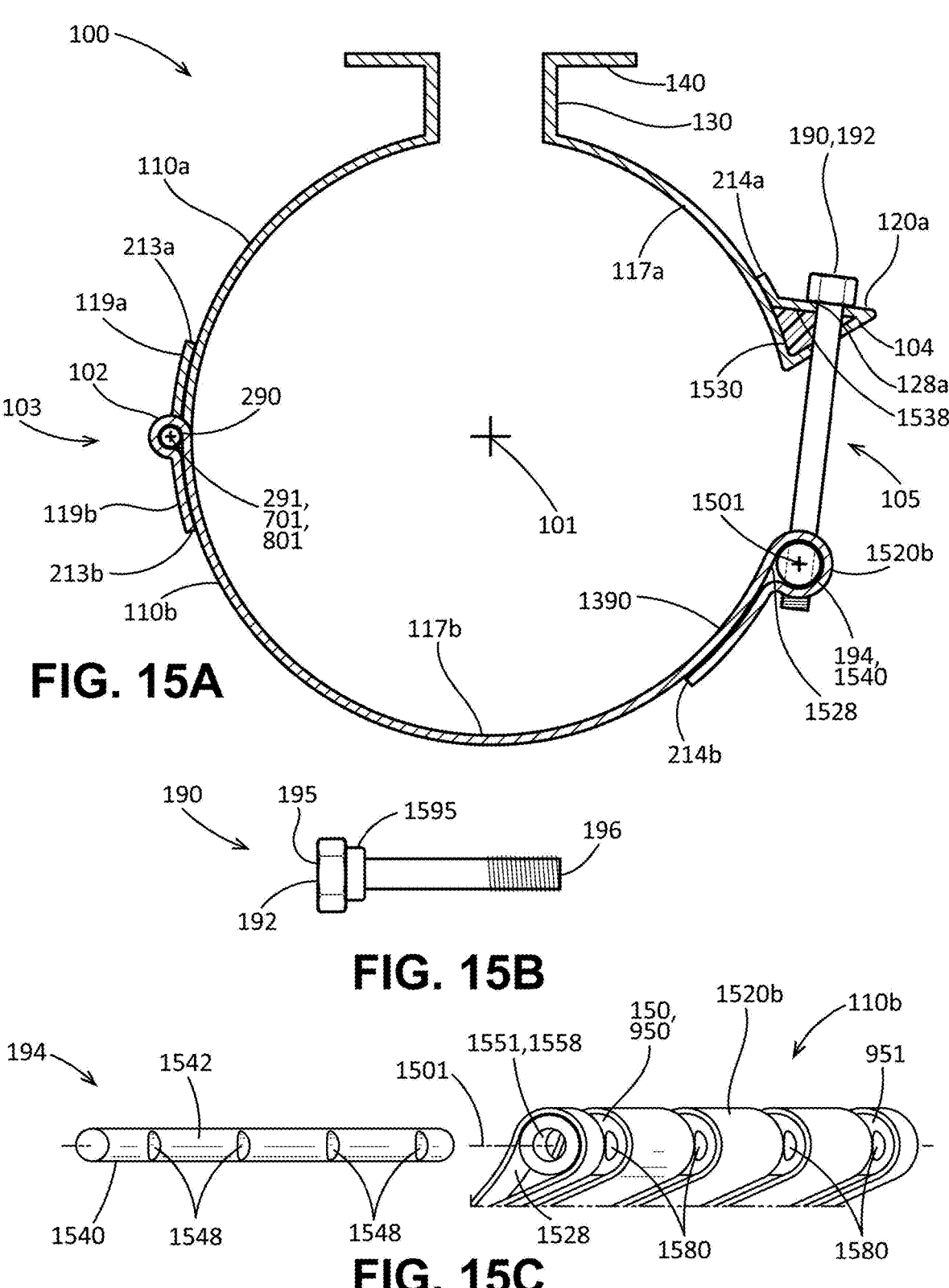
FIG. 15A is a sectional view of the tapping sleeve of FIG. 1 taken along line 15-15 of FIG. 4 in accordance with another aspect of the current disclosure.
FIG. 15B is a side view of a fastener of the tapping sleeve of FIG. 15A in accordance with another aspect of the current disclosure.
FIG. 15C is a detail side perspective view of a portion of the connection side of the tapping sleeve of FIG. 15A in accordance with another aspect of the current disclosure.

FIG. 15A is a sectional view of the tapping sleeve 100 of FIG. 1 taken along line 15-15 of FIG. 4 in accordance with another aspect of the current disclosure. In some aspects, as shown, a flange of the sleeve portions 110a,b such as, for example and without limitation, the flange 120a of the sleeve portion 11a can be monolithically formed from the arcuate portion 117a. Either of the sleeve portions 110a,b can be monolithically formed from the terminal end 213a,b to a respective terminal end 213a,b. As shown, disregarding the neck 130 and the neck flange 140, the sleeve portion 110*a* can be monolithically formed from the terminal end 213*a* to the terminal end 214*a*. As also shown, the sleeve portion 110*b* can be monolithically formed from the terminal end 213*b* to the terminal end 214*b*. The terminal ends 213*a,b* can be proximate to the first side end 113*a,b*, and the terminal ends 213*a,b* can be proximate to the second side ends 114*a,b*. As shown, the connecting element 290 and, more specifically, the axis 291 thereof can be receivable through the hinge 102 along a single connection axis 701 and a single mounting bore axis 801.

A portion of the flange 120*a* that is proximal to the terminal end 214*a* or a portion of any retaining fold or retaining member 119 disclosed herein can extend parallel to or in a concentric radius with respect to the corresponding arcuate portion 117*a,b* of the respective sleeve portion 110*a,b*. The joint between the flange 120*a,b* and the arcuate portion 117*a,b* or between the flange retaining member 119 and the arcuate portion 117*a,b* can be formed by any one or more of multiple methods such as, for example and without limitation, welding, staking, clinching, bolting, or riveting.

One or more of the fasteners 190 and, more specifically, the first portion 192 of the connection 104 can extend through a flange such as the flange 120*a*. The flange 120*a,b*, which can be hollow and can define a cavity 1538, can receive an insert 1530 therein. In some aspects, the insert 1530 can be formed from a rigid material such as, for example and without limitation, polycarbonate. In some aspects, the insert 1530 can be formed from any other rigid or non-rigid material. The insert 1530 can help maintain a shape of the flange 120*a,b* in cross-section even upon tightening of the connector 190.

One or more of the fasteners 190 and, more specifically, the first portion 192 of the connection 104 can engage the second portion 194, which can extend through a flange such as the flange 120*b* or, as shown, can be received within the retaining member or retaining fold 1520*b*. The retaining fold 1520*a,b*, which can be hollow and can define a mounting bore 1528, can receive the second portion 194 of the connector 190 therein. A shape of the retaining fold 119*a,b* can be maintained with a weld such as, for example and without limitation, the weld 1390. The second portion 194 can comprise a body 1540 defining an outer surface 1542 and an axis 1501. The body 1540 can define engagement bores 1548 therein, each of which or any of which can engage an end of the corresponding first portion 192 of the connector 190. In some aspects, a retaining member or retaining fold can replace either or both of the flanges 120*a,b* like the retaining fold 1520*b* can replace the flange 120*b*. A retaining fold replacing the flange 120*a* can similar receive yet another portion of the connector 190, as the retaining fold 1520*b* receives the second portion 194 defining the body 1540, and like the second portion 194 the additional portion proximate to an end of the first portion 192 opposite from the second portion 194 need not be threaded and can define a clearance hole for passage of a shaft of the first portion 192 but not a head thereof.

FIG. 15B is a side view of the connector 190 and, more specifically, a first portion 192 of the connector 190 of the tapping sleeve 100 of FIG. 15A in accordance with another aspect of the current disclosure. As shown, the first portion 192 can define a first end 195 and a second end 196. The first end 195 can define a fastener head (e.g., a hex head engageable with a hex wrench or socket). An underside of the first end 195, which can contact and/or be received within the securing bore 128*a,b*, can comprise the shoulder 1595. A diameter of the shoulder 1595 can be less than a diameter of the first end 195 and can be greater than a diameter of the second end 196. As shown, the second end 196 can be threaded or can defined a threaded portion. The shoulder 1595 can help maintain a position of the first end 195 of the connector 190 with respect to the flange 120*a,b* and, more generally, the tapping sleeve 100.

FIG. 15C is a detail side perspective view of a portion of the connection side 105 of the tapping sleeve 100 of FIG. 15A in accordance with another aspect of the current disclosure. In some aspects, the second portion 194 can be formed from a rigid material such as, for example and without limitation, steel. In some aspects, the second portion 194 can be formed from any other rigid material or non-rigid material, particularly where the first portion 192 of the connector 190 engages with a separate portion of the fastener (e.g., a cotter pin) beyond the second portion 194. The second portion 194 and, more specifically, the body 1540 thereof can be engaged by any and all of a plurality of first portions 192 of the fasteners 190, which can be distributed at intervals along an axial length of the connection side 105 of the tapping sleeve 100. The first portions 192 and, more specifically, threaded portions defined in the second ends 196 thereof can be received within engagement bores 1548 defined in the body 1540 and in the outer surface 1542 thereof. In some aspects, the engagement bores 1548 can be threaded and can engage a threaded end of the corresponding first portion 192. In some aspects, the engagement bores 1548 need not be threaded. In some aspects, the second portion 194 and, more specifically, the body 1540 can be received directly within and can directly contact the mounting bore 1528 of the retaining fold 1520*b*. In some aspects, the second portion 194 and, more specifically, the body 1540 can be a rod nut.

In some aspects, another form of the insert 150 comprising the body 950 can be received within the mounting bore 1528 of the retaining fold 1520*b*. More specifically, the insert 150 can be positioned between the mounting bore 1528 and the body 1540 of the second portion 194 of the connector 190. In addition to defining the outer surface 951, the insert can define a central bore 1558 defining an inner surface 1551. As such, the body 1540 of the second portion 194 can be received within and can contact the central bore 1558 and the inner surface 1551. Clearance bores or engagement bores 1580 can be defined in the insert 150 at intervals matching the intervals at which the engagement bores 1548 are spaced.

In some aspects, the insert 150 can be formed from a non-rigid material. More specifically, the insert 150 can be formed from an elastomeric material such as, for example and without limitation, rubber of any one of a variety of types including urethane rubber. More specifically, the insert 150 can be formed from a non-metallic material such as, for example and without limitation, a polymer. The insert 150 can be compressible in normal use, by which it is contemplated those loads that are experienced during use of the tapping sleeve and not, for example, only under the tons of force able to be applied in some manufacturing operations. In some aspects, the second portion 194 can be formed from any other non-rigid or rigid material, depending on whether compressibility of the insert 150 is desired. When the insert 150 is formed from an elastic material, the insert 150 can be a spring in the connection side 105 of the tapping sleeve 100 to allow for extended elasticity of the connection 104 under certain loading conditions. In some aspects, the connection 104 can comprise a separate spring (coil type or otherwise), which can be positioned inside the insert 150 or second portion 194, which in some aspects can be the insert 150. Elasticity or a spring in either the connection side 105 or the hinge side 103 of the tapping sleeve 100 can facilitate flexibility in a connection between the tapping sleeve 100 and the pipe element 80 (shown in FIG. 2) and can accommodate highly dynamic pipe such as, for example and without limitation, pipe elements 80 made from high-density polyethylene (HDPE).

FIG. 16A is a sectional view of a tapping sleeve 100 in accordance with another aspect of the current disclosure. The second portion 194 of the one or more fasteners 190 of the tapping sleeve 100 can be a captive nut, which can be held captive within the cover 1610. In some aspects, the tapping sleeve can comprise a compression beam 1620, which can extend in an axial direction of the tapping sleeve 100 and between two or more fasteners 190. Again, the plug 1670 can be positioned in the plug bore 137 and the plug bore 137 can be selectively sealed or opened to the neck bore 138. As shown, the tapping sleeve 100 need not comprise the hinge 102 and the one or more sleeve portions 110 can, before fastening of the fasteners 190, be flexed or bent open to receive the pipe element 80 (shown in FIG. 2). As shown, the connection side angle 1670 measured between a bisector of the connection side 105 and the axis 231 can be greater than 90 degrees to facilitate access by a tool configured to remove the connector 190. In some aspects, the connection side angle 1670 can measure between 120 degrees and 150 degrees.

Figure 16B:
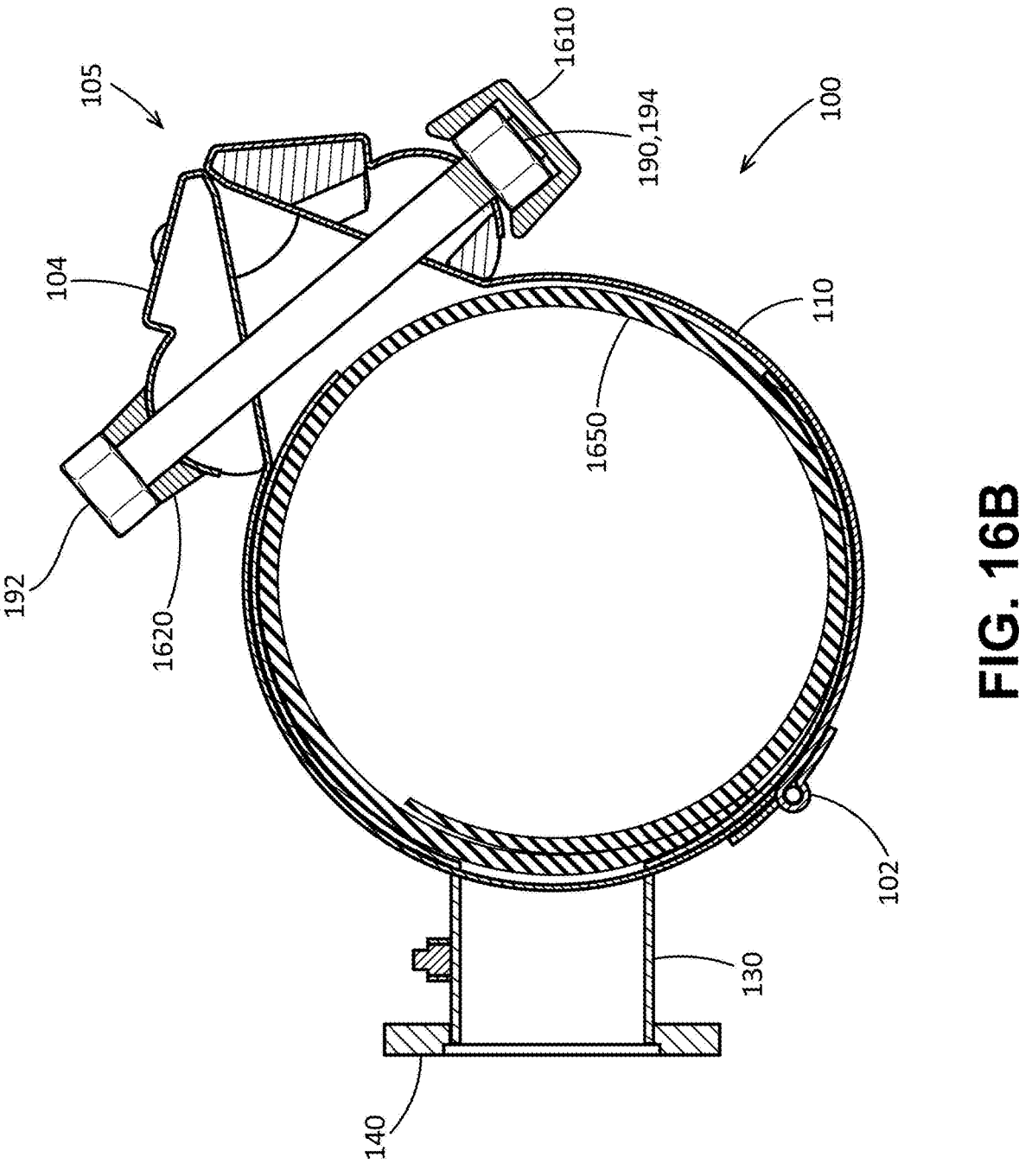
FIG. 16B is a sectional view of a tapping sleeve in accordance with another aspect of the current disclosure.

FIG. 16B is a sectional view of a tapping sleeve 100 in accordance with another aspect of the current disclosure. As shown, the tapping sleeve 100 can comprise the hinge 102 in any of the forms disclosed herein such as, for example and without limitation, the form defining a single connection axis 701 (shown in FIG. 15), as exemplarily shown also in FIG. 15A. The tapping sleeve 100, as with any of the other features and aspects disclosed herein, can comprise a gasket or seal 1650, which can facilitate a seal and thereby prevent passage (e.g., leakage) of a fluid or contamination into or out of the pipe element 80 (shown in FIG. 2) between the tapping sleeve 100 and the pipe element 80. In some aspects, the seal can comprise or can be formed from an elastomeric material. In some aspects, the seal can comprise or can be formed from any material suitable for creating a sufficient seal under the end-use conditions. As shown, the seal 1650 can define circumferential ends, which can overlap.

Figures 17A, 17B, 17C, 17D:
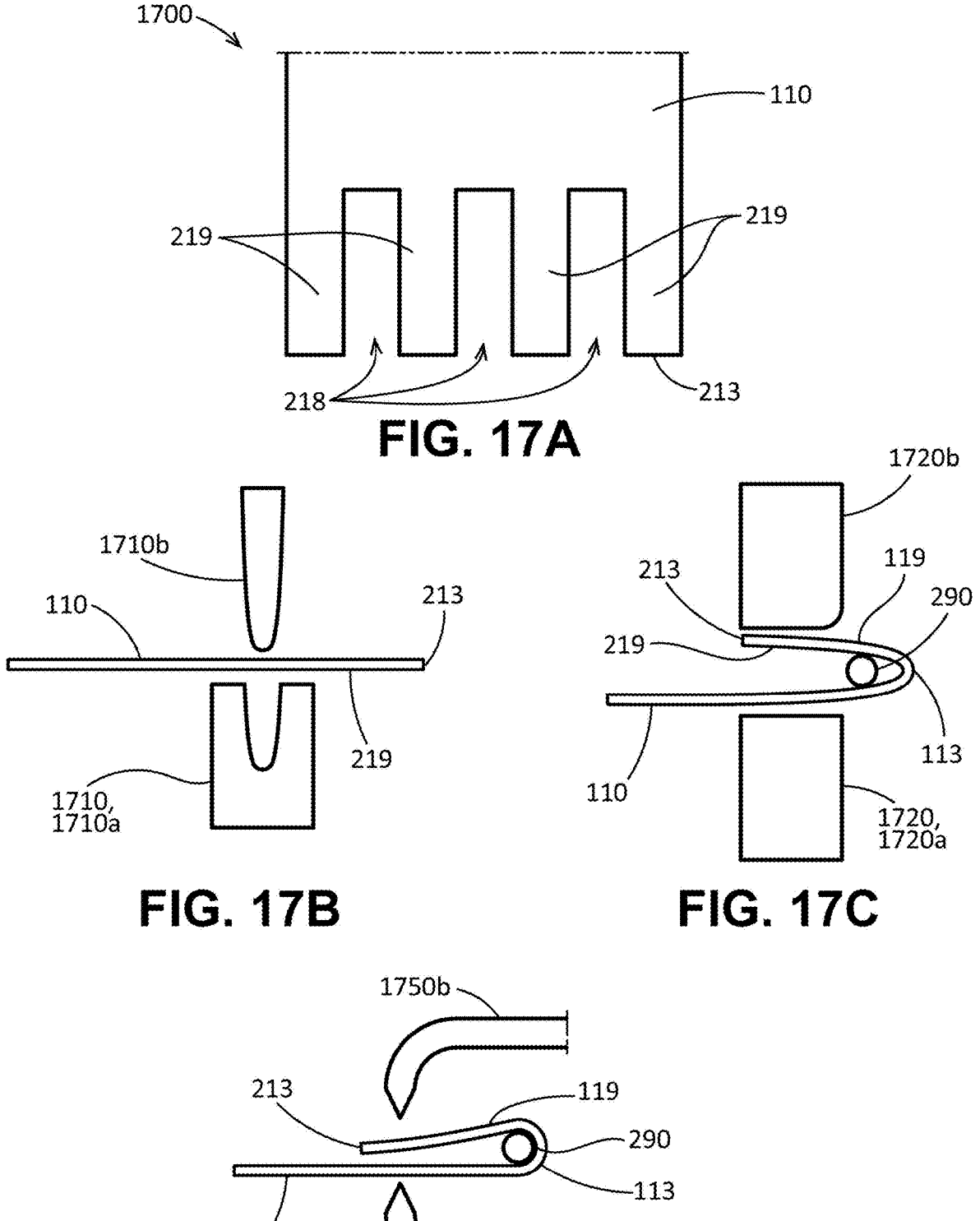
FIG. 17A is a top plan view of a blank for forming a sleeve portion of the tapping sleeve of FIG. 1 in accordance with another aspect of the current disclosure.
FIG. 17B is a side view of the blank of FIG. 17A being formed by a first set of press brake dies into the hinge portion or hinge side of FIG. 13 in a first step in accordance with another aspect of the current disclosure.
FIG. 17C is a side view of the hinge side of FIG. 17B being formed by a second set of press brake dies in a second step.
FIG. 17D a side view of the hinge side of FIG. 17C being welded by tips of a spot-welding machine in a third step.

FIG. 17A is a top plan view of a blank 1700 for forming a sleeve portion 110 of the tapping sleeve 100 of FIG. 1 in accordance with another aspect of the current disclosure. Each of or any of a plurality of tabs 219 can terminate in the terminal ends 213 of the sleeve portion 110. The adjacent tabs 219 can define the gaps 218 therebetween.

FIG. 17B is a side view of the blank of FIG. 17A being formed by a first set 1710 of press brake dies 1710a,b into the hinge portion or hinge side 103 of the sleeve portion 110 of FIG. 13 in a first step in accordance with another aspect of the current disclosure. A method of forming the blank 1700 and, more specifically, the first side end 113 of the sleeve portion 110 can comprise forming one or more retaining folds 119 (shown in FIG. 17C) in the blank 1700 and, more specifically, in the tabs 219 by moving the second or upper press brake die 1710b with respect to the first or lower press brake die 1710a. In some aspects, the press brake dies 1710a,b can be standard bending dies, each of which can define a V-shaped valleys or tip with the appropriate clearances or reliefs.

FIG. 17C is a side view of the hinge side 103 of FIG. 17B being formed by a second set 1720 of press brake dies 1720a,b in a second step. The method of forming the blank 1700 and, more specifically, the first side end 113 of the sleeve portion 110 can comprise flattening the one or more retaining folds 119 in the blank 1700 by moving the second or upper press brake die 1720b with respect to the first or lower press brake die 1720a. In some aspects, the press brake dies 1720a,b can be standard flattening dies, each of which can define a flat end. In some aspects, the press brake die set 1710 and the press brake die set 1720 can be set up in the same press brake operation with a single machine set-up.

FIG. 17D a side view of the hinge side 103 of FIG. 17C being welded by tips 1750a,b of a spot-welding machine 1750 in a third step. The method of forming the blank 1700 and, more specifically, the first side end 113 of the sleeve portion 110 can comprise joining the one or more retaining folds 119 in the blank 1700 and, more specifically, welding the one or more retaining folds 119 by moving the second or upper tip 1750b with respect to the first or lower tip 1750a. In some aspects, the tips 1750a,b can be standard tapered tips, each of which can define a flat end. The tips 1750a,b can be offset to extend some distance past the first side end 113 at which the weld 1390 (shown in FIG. 13) is to be created.

FIG. 18A is a side view, which can be equivalent to a sectional view, of the hinge side 103 of the sleeve portion 110 of FIG. 16B being formed in a first step in accordance with another aspect of the current disclosure. A corresponding method of forming the hinge side 103 can comprise forming the tab 219 into an arcuate shape with appropriate forming dies (not shown, but familiar to one of ordinary skill in the art).

FIG. 18B is a side view of the hinge side 103 of the sleeve portion 110 of FIG. 16B being formed in a second step. The method can comprise contacting the outer surface 112 of the sleeve portion 110 with the terminal end 213. In some aspects, an angle 1870 between the terminal end 213 and, more specifically, between the surfaces 111,112 at the terminal end 213 can be angled with respect to the surfaces 111,112 where the terminal end 213 contacts the surfaces 111,112 at a distance offset from the terminal end 213. More specifically, in some aspects, the angle 1870 can measure 90 degrees or approximately 90 degrees. In some aspects, the angle 1870 can measure between 60 and 120 degrees. In some aspects, the angle 1870 can measure between 45 and 135 degrees. In some aspects, the angle 1870 can be 45 degrees or less, as shown in FIG. 3.

FIG. 18C is a side view of the hinge side 103 of the sleeve portion 110 of FIG. 16B being welded in a third step. The method can comprise welding a seam or joint between the terminal end 213 and a separate portion of the hinge side 103 of the sleeve portion 110, which can help maintain a shape of the retaining fold 119. The method can comprise laying a weld 1890 at the seam or joint, which can comprise filler material, e.g., from a welding rod. Again, the retaining fold can define the connection axis 701, the mounting bore 1180, and a mounting bore diameter 1880. In some aspects, the mounting bore diameter 1880 can be greater than a diameter of the connecting element 290 (shown in FIG. 8) to create at least a small clearance gap therebetween. In some aspects, the mounting bore diameter 1880 can be equal to the diameter of the connecting element 290 to create no gap and a press fit therebetween. More specifically, an entrance on or more sides of any of the mounting bores 1180 can be flared to facilitate insertion of the connecting element 290. In some aspects, the mounting bore diameter 1880, at least on one side of the hinge 102, can be less than the diameter of the connecting element 290 to create an interference fit therebetween.

FIG. 19A is a side view, which can be a sectional view, of the hinge side 103 of the sleeve portion 110 in accordance with another aspect of the current disclosure. In some aspects, the one or more retaining members 119, which can be broadly defined as encompassing any structure defining at least a partially closed shape that is able to receive the connecting element 290, can be formed separately from the arcuate portion 117 and can be secured to the arcuate portion 117, e.g., by welding. As shown, the retaining members 119 can be individual tube-shaped elements (e.g., hollow dowels or pins) defining outer and inner surfaces and no end. As such, each of or any of the retaining members 119 can define an annular shape and can substitute for the retaining folds or retaining members 119 formed monolithically from the sleeve portions 110a,b and shown in various other figures such as, for example and without limitation, FIGS. 1 and 13.

FIG. 19B is a side view of the hinge side 103 of the sleeve portion 110 of FIG. 19A in accordance with another aspect of the current disclosure. In some aspects, as shown, a center-to-center spacing 1970 of the retaining members 119 can be greater than a diameter of any individual retaining member 119. By adjusting the spacing 1970, a spacing of axes 801,802,803 can be adjusted. In some aspects, the retaining members 119 can be formed (e.g., molded or cast) monolithically from the sleeve portion 110. More specifically, the mounting bores 1180 and the diameter 1880 can be defined directly by a material forming the sleeve portion 110 or a portion thereof without mechanically forming the tabs 219 or attaching separate retaining members 119.

Figures 20A, 20B, 20C:
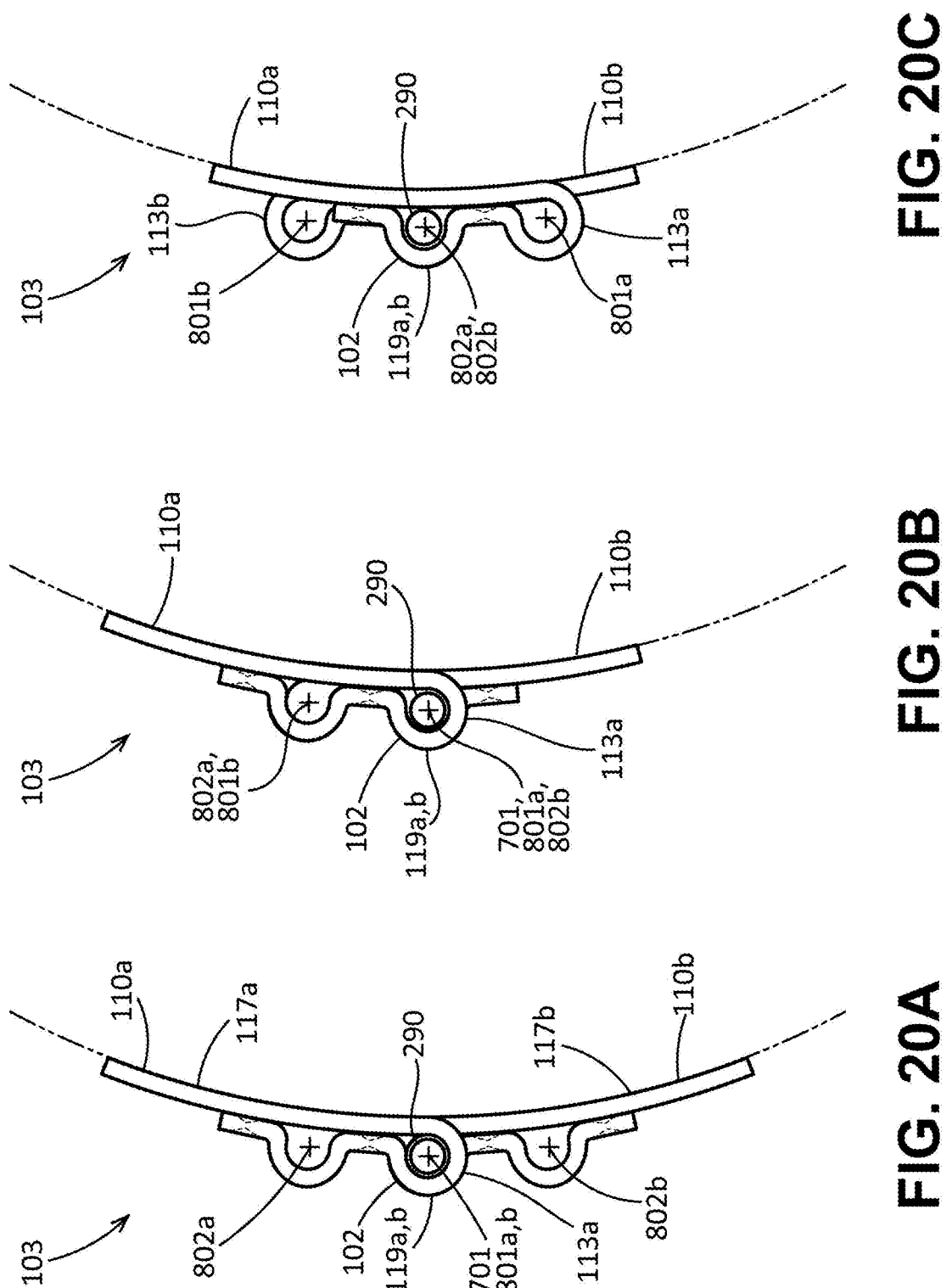
FIG. 20A is a side view of an assembled hinge of the tapping sleeve of FIG. 14A in a first assembled condition taken along line 20-20 of FIG. 14A.
FIG. 20B is a side view of the assembled hinge of FIG. 20A in a second assembled condition taken along line 20-20 of FIG. 14A.
FIG. 20C is a sideview of the assembled hinge of FIG. 20A in a third assembled condition taken along line 20-20 of FIG. 14A.

FIG. 20A is a side view of an assembled hinge 102 of the tapping sleeve 100 of FIG. 14A in a first assembled condition, configuration, or position taken along line 20-20 of FIG. 14A. The sleeve portions 110a,b are shown as terminating a relatively short distance from the retaining folds 119 but can, as separately disclosed herein, extend far enough in an arcuate shape—or other shape, as appropriate to match a cross-sectional shape of the pipe element 80 (shown in FIG. 2)—towards a connection side 105 to be able to wrap around the pipe element 80. As shown, the connecting element 290 can extend along and can thereby be aligned with the mounting bore axis 801a of the sleeve portion 110a and with the mounting bore axis 801b of the sleeve portion 110b to form the connection axis 701. Mounting bore axes 802a,b remain unused.

FIG. 20B is a side view of the assembled hinge 102 of FIG. 20A in a second assembled condition taken along line 20-20 of FIG. 14A. As shown, the connecting element 290 can extend along and can thereby be aligned with the mounting bore axis 801a of the sleeve portion 110a and with the mounting bore axis 802b of the sleeve portion 110b to form the connection axis 701. Mounting bore axes 801b and 802a remain unused.

FIG. 20C is a side view of the assembled hinge 102 of FIG. 20A in a third assembled condition taken along line 20-20 of FIG. 14A. As shown, the connecting element 290 can extend along and can thereby be aligned with the mounting bore axis 802a of the sleeve portion 110a and with the mounting bore axis 802b of the sleeve portion 110b to form the connection axis 701. Mounting bore axes 801a,b remain unused. As the connection axis 701 is formed by different combinations of mounting bore axes such as, for example and without limitation, the mounting bore axes 801a,b,802a,b,803a,b of the sleeve portions 110a,b, the effective inside diameter D of the tapping sleeve 100 in an assembled condition can vary between any two or more of the assembled conditions. As shown in FIG. 20C, maximizing an overlap between or created by the first side ends 113a,b can minimize a circumference of the tapping sleeve 100 and thereby minimize the effective inside diameter D. In contrast, as shown in FIG. 20A, minimizing an overlap between or created by the first side ends 113a,b can maximize a circumference of the tapping sleeve 100 and thereby maximize the effective inside diameter D. Increasing the number of mounting bore axes—beyond, for example, the two or three mounting bore axes disclosed herein—can increase the number of possible assembly conditions forming unique connection axes 701 and thereby increase the range of diameters of the pipe element 80 that can be accommodated by the tapping sleeve 100.

A method of using the tapping sleeve 100 or, more generally, the device 100 can comprise forming each of or any of a plurality of sleeve portions such as the sleeve portions 110a,b. In some aspects, as described above, one or more of the plurality of sleeve portions 110a,b can define a plurality of retaining members 119 to facilitate adjustability of the hinge 102 joining adjacent sleeve portions 110a,b of the plurality of sleeve portions 110a,b. In some aspects, the method can comprise joining two adjacent sleeve portions 110a,b, each having "n" mounting bores 1180, to form "2n–1" assembly conditions. In some aspects, the method can comprise joining two adjacent sleeve portions 110a,b, one having "n" mounting bores 1180 and the other having one mounting bore 1180, to form "n" assembly conditions. The method can comprise deforming the insert 150 when the insert 150 is positioned in one of the hinge side 103 and the connection side 105 of the tapping sleeve, the effective inside diameter D of the tapping sleeve increasing as a result of the deformation. The method can comprise deforming the insert 150 when the insert 150 is positioned inside the retaining member 119 of at least one sleeve portion 150a,b of the tapping sleeve.

In some aspects, the tapping sleeve 100 can be used with the pipe element 80 in a water distribution system. In some aspects, the structures described as part of the tapping sleeve 100 can be used in distribution systems transporting other media (e.g., gas) and can be incorporated into other clamping devices (e.g., a service saddle).

In some aspects, various components of the tapping sleeve 100 can be formed from or comprise a metal such as, for example and without limitation, steel. In some aspects, the various components can be formed from any other material, any of which can optionally be corrosion-resistant or replaceable for serviceability. The various components of the tapping sleeve 100 can be formed from any one or more of a variety of manufacturing processes. For example and without limitation, the sleeve portions 110a,b, the inserts 150, and other components can be fabricated using purely subtractive manufacturing processes such as machining, forging, stamping; purely additive manufacturing processes such as three dimensional printing; molding and casting; and any other forming and assembly processes such as bending and riveting.

One should note that conditional language, such as, among others, "can," "could," "might," or "may" unless expressly stated otherwise, or otherwise understood within the context as used, is generally intended to convey that certain aspects include, while other aspects do not include, certain features, elements, and/or steps. Thus, such conditional language is not generally intended to imply that features, elements and/or steps are in any way required for one or more particular aspects or that one or more particular aspects necessarily comprise logic for deciding, with or without user input or prompting, whether these features, elements and/or steps are included or are to be performed in any particular aspect.

It should be emphasized that the above-described aspects are merely possible examples of implementations, merely set forth for a clear understanding of the principles of the present disclosure. Any process descriptions or blocks in flow diagrams should be understood as representing modules, segments, or portions of code which comprise one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described aspect(s) without departing substantially from the spirit and principles of the present disclosure. Further, the scope of the present disclosure is intended to cover any combinations and sub-combinations of all elements, features, and aspects discussed above. All such modifications and variations are intended to be included within the scope of the present disclosure, and all possible claims to individual aspects or combinations of elements or steps are intended to be supported by the present disclosure.

That which is claimed is:

1. A tapping sleeve for a pipe element, the tapping sleeve comprising:
   a first sleeve portion defining:
      a first axial end;
      a second axial end;
      a first side end;
      a second side end; and
      an arcuate portion extending between the first side end and the second side end; and
   a second sleeve portion hingedly secured to the first sleeve portion and defining:
      a first axial end;
      a second axial end;
      a first side end;
      a second side end; and
      an arcuate portion extending between the first side end of the second sleeve portion and the second side end of the second sleeve portion; and
   a connecting element:
      received within each of the first sleeve portion and the second sleeve portion; and
      joining the first side end of the first sleeve portion to the first side end of the second sleeve portion;
      wherein the connecting element, the first side end of the first sleeve portion, and the first side end of the second sleeve portion define at least a portion of a hinge of the tapping sleeve, the hinge defining at least two assembled conditions, a position of the first sleeve portion with respect to the second sleeve portion in an assembled condition in a circumferential direction of the tapping sleeve being different between the at least two assembled conditions.

2. The tapping sleeve of claim 1, wherein the connecting element is a rigid pin.

3. The tapping sleeve of claim 1, wherein the first sleeve portion further defines a neck extending from the arcuate portion, the arcuate portion of the first sleeve portion defining a tapping bore and the neck defining a neck bore, each of the tapping bore and the neck bore configured to receive a tool for tapping into the pipe element.

4. The tapping sleeve of claim 1, wherein the first sleeve portion is an outlet band and the second sleeve portion is a cap band.

5. The tapping sleeve of claim 1, further comprising a flange, wherein the flange is monolithically formed from the arcuate portion of the one of the first sleeve portion and the second sleeve portion.

6. The tapping sleeve of claim 1, wherein an effective inside diameter of the tapping sleeve in an assembled condition varies between the at least two assembled conditions.

7. The tapping sleeve of claim 1, wherein the first sleeve portion comprises an insert defining a plurality of mounting bores, each of the plurality of mounting bores sized to selectably receive the connecting element, the insert positioned proximate to the first side end of the first sleeve portion.

8. The tapping sleeve of claim 7, wherein the first sleeve portion defines a retaining member receiving at least a portion of the insert therein.

9. The tapping sleeve of claim 7, wherein the first sleeve portion comprises a plurality of inserts, each insert received within a retaining member defined by a corresponding tab of a plurality of tabs defined by the first side end of the first sleeve portion, adjoining tabs of the plurality of tabs defining a gap therebetween, the gap sized to receive at least a portion of the first side end of the second sleeve portion.

10. The tapping sleeve of claim 7, wherein a position of the insert with respect to a surrounding portion of the first sleeve portion is maintained with one of a staked connection, a friction fit, and a chemical bond.

11. The tapping sleeve of claim 1, wherein the first side end of the first sleeve portion defines a plurality of mounting bores, each of the plurality of mounting bores sized to selectably receive the connecting element.

12. The tapping sleeve of claim 11, wherein a retaining member defined by the first side end of the first sleeve portion defines each of the plurality of mounting bores.

13. The tapping sleeve of claim 12, wherein a shape of the retaining member is maintained during use by a weld.

14. The tapping sleeve of claim 11, wherein the first side end of the first sleeve portion comprises a plurality of tabs, each tab of the plurality of tabs defining a retaining member defining each of a plurality of mounting bores, each set of at least two sets of mounting bores of the plurality of tabs defining a common axis along which the connecting element can be received therein, adjoining tabs of the plurality of tabs defining a gap therebetween, the gap sized to receive at least a portion of the first side end of the second sleeve portion.

15. The tapping sleeve of claim 11, wherein each of the plurality of mounting bores is tube-shaped.

16. The tapping sleeve of claim 1, wherein the first side end of the second sleeve portion comprises a plurality of tabs, each tab of the plurality of tabs of the second sleeve portion defining a retaining member defining a mounting bore, the mounting bores of the plurality of tabs of the second sleeve portion defining a common axis along which the connecting element can be received therein, adjoining tabs of the plurality of tabs of the second sleeve portion defining a gap therebetween, the gap sized to receive at least a portion of the first side end of the first sleeve portion.

17. The tapping sleeve of claim 1, wherein the connecting element comprises a pin.

18. The tapping sleeve of claim 1, wherein the connecting element extends in an axial direction of the tapping sleeve.

19. The tapping sleeve of claim 1, wherein the connecting element is received within a mounting bore defined by the first side end of the first sleeve portion and the first side end of the second sleeve portion and extends.

20. The tapping sleeve of claim 19, wherein the connecting element is slideably received within the mounting bore along a mounting bore axis defined by the mounting bore.

21. The tapping sleeve of claim 1, wherein the connecting element is received within a plurality of tabs defined by the first side end of the first sleeve portion and the first side end of the second sleeve portion, the plurality of tabs alternating across an axial length of the tapping sleeve, the plurality of tabs sequentially comprising:

a first tab of the first sleeve portion, a first tab of the second sleeve portion, a second tab of the first sleeve portion, and a second tab of the second sleeve portion.

22. The tapping sleeve of claim 21, wherein each of the plurality of tabs comprises a retaining fold.

23. The tapping sleeve of claim 22, wherein the retaining fold of each of the plurality of tabs is formed monolithically from a material defining an arcuate portion of the first sleeve portion.

24. The tapping sleeve of claim 1, wherein the hinge defines a center of rotation about which each of the first sleeve portion and the second sleeve portion are configured to rotate.

25. The tapping sleeve of claim 1, wherein at least one of the first sleeve portion and the second sleeve portion comprises a plurality of tabs.

26. The tapping sleeve of claim 25, wherein each of the plurality of tabs defines a retaining fold.

27. The tapping sleeve of claim 26, wherein the retaining fold defines a mounting bore, the mounting bore defining a mounting bore axis for selectably receiving the connecting element.

28. The tapping sleeve of claim 25, wherein the plurality of tabs define a plurality of mounting bores, a first set of mounting bores of the plurality of tabs defining a first common axis along which the connecting element can be received therein, a second set of mounting bores of the plurality of tabs defining a second common axis along which the connecting element can be received therein, adjoining tabs of the plurality of tabs defining a gap therebetween, the gap sized to receive at least a portion of the first side end of the second sleeve portion.

29. The tapping sleeve of claim 1, wherein at least one of the first sleeve portion and the second sleeve portion comprises a retaining member configured to receive the connecting element, the retaining member being coupled to at least one of the arcuate portion of the first sleeve portion and the arcuate portion of the second sleeve arcuate portion by welding.

30. The tapping sleeve of claim 29, wherein the tapping sleeve comprises a plurality of retaining members comprising the retaining member, each of the plurality of retaining members defining an axis, axes of adjacent retaining members of the plurality of retaining members being offset from each other by a center-to-center spacing.

31. The tapping sleeve of claim 30, wherein the center-to-center spacing of the adjacent retaining members is greater than a diameter of each of the retaining members.

32. The tapping sleeve of claim 29, wherein the first side end of the second sleeve portion comprises a plurality of tabs, each tab of the plurality of tabs of the second sleeve portion defining a retaining member defining a mounting bore, the mounting bores of the plurality of tabs of the second sleeve portion defining a common axis along which the connecting element can be received therein, adjoining tabs of the plurality of tabs of the second sleeve portion defining a gap therebetween, the gap sized to receive at least a portion of the first side end of the first sleeve portion.

33. The tapping sleeve of claim 29, wherein the retaining member is tube-shaped and defines outer and inner surfaces.

34. A device for a pipe element, the device comprising:

a first sleeve portion defining:

a first axial end;

a second axial end;

a first side end;

a second side end, one of the first side end or the second side end defining at least one insert, the at least one insert being deformable in normal use after assembly of the device; and an arcuate portion extending between the first side end and the second side end;

a second sleeve portion hingedly secured to the first sleeve portion and defining:

a first axial end;

a second axial end;

a first side end;

a second side end; and an arcuate portion extending between the first side end of the second sleeve portion and the second side end of the second sleeve portion; and one of a connecting element and a connector extending through the at least one insert and joining the first side end of the first sleeve portion to the first side end of the second sleeve portion;

wherein the first side end of the first sleeve portion, the first side end of the second sleeve portion, and the one of the connecting element and the connector define at least a portion of a hinge side and a connecting side of the device, an effective inside diameter of the device being configured to increase as a result of deformation of the at least one insert.

35. The device of claim 34, wherein the second side end of one of the first sleeve portion and the second sleeve portion defines a flange extending at least in part in a radial direction of the device.

36. The device of claim 35, wherein the flange is monolithically formed from the arcuate portion of the one of the first sleeve portion and the second sleeve portion.

37. The device of claim 35, wherein the second side end of the other of the first sleeve portion and the second sleeve portion defines a retaining member, the device further comprising a connector comprising a first portion and a second portion, the second portion received within the retaining member, the second portion being configured to engage with the first portion.

38. The device of claim 37, wherein the second portion is received within an insert formed from an elastomeric material, the insert received within the retaining member.

39. The device of claim 34, wherein:

the one of the connecting element and the connector comprises the connecting element, the connecting element extending through the at least one insert and joining the first side end of the first sleeve portion to the first side end of the second sleeve portion; and the first side end of the first sleeve portion, and the first side end of the second sleeve portion, and the connecting element define at least a portion of the hinge side of the device.

40. The device of claim 34, wherein:

the one of the connecting element and the connector comprises the connector, the connector extending through the at least one insert and joining the first side end of the first sleeve portion to the first side end of the second sleeve portion; and the first side end of the first sleeve portion, and the first side end of the second sleeve portion, and the connector define at least a portion of the connection side of the device.

\*   \*   \*   \*   \*